(12) United States Patent
Foote et al.

(10) Patent No.: US 8,764,256 B2
(45) Date of Patent: Jul. 1, 2014

(54) VEHICLE EXTERIOR MIRROR SYSTEM WITH LIGHT MODULE

(75) Inventors: Keith D. Foote, Grand Rapids, MI (US); Eric S. Deuel, Allendale, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 40 days.

(21) Appl. No.: 13/249,433

(22) Filed: Sep. 30, 2011

(65) Prior Publication Data

US 2012/0081915 A1    Apr. 5, 2012

Related U.S. Application Data

(60) Provisional application No. 61/388,747, filed on Oct. 1, 2010.

(51) Int. Cl.
| | | |
|---|---|---|
| *B60Q 1/12* | (2006.01) | |
| *B60Q 1/26* | (2006.01) | |
| *F21S 8/10* | (2006.01) | |
| *B60R 1/12* | (2006.01) | |

(52) U.S. Cl.
CPC .............. *B60R 1/12* (2013.01); *B60Q 1/2665* (2013.01); *B60Q 2400/20* (2013.01); *B60R 1/1207* (2013.01); *B60R 2001/1253* (2013.01); *F21S 48/215* (2013.01)
USPC ............................ 362/494; 362/529; 362/545

(58) Field of Classification Search
CPC ...... F21S 48/00; F21S 48/215; B60Q 1/0029; B60Q 1/0035; B60Q 1/0041; B60Q 1/02; B60Q 1/06; B60Q 1/18; B60Q 1/28; B60Q 1/34; B60Q 1/56; B60Q 1/245; B60Q 1/2607; B60Q 1/2661; B60Q 1/2665; B60R 1/207
USPC ............................ 362/494, 36, 464, 508, 466
See application file for complete search history.

(56) References Cited

U.S. PATENT DOCUMENTS

| | | | |
|---|---|---|---|
| 4,041,301 | A | 8/1977 | Pelchat |
| 4,788,630 | A | 11/1988 | Gavagan |
| 4,972,173 | A | 11/1990 | Raciti |
| 5,040,103 | A | 8/1991 | Lyons |
| 5,233,375 | A | 8/1993 | Williams et al. |
| 5,297,010 | A | 3/1994 | Camarota et al. |
| 5,371,659 | A | 12/1994 | Pastrick et al. |
| 5,497,305 | A | 3/1996 | Pastrick et al. |
| 5,497,306 | A | 3/1996 | Pastrick |
| 5,499,169 | A * | 3/1996 | Chen ............................ 362/494 |
| 5,581,230 | A | 12/1996 | Barrett |

(Continued)

FOREIGN PATENT DOCUMENTS

| | | |
|---|---|---|
| DE | 10212794 | 6/2003 |
| EP | 1284335 | 2/2003 |

(Continued)

*Primary Examiner* — Diane Lee
*Assistant Examiner* — Kenny C Sokolowski
(74) *Attorney, Agent, or Firm* — Gardner, Linn, Burkhart & Flory, LLP

(57) ABSTRACT

A lighted exterior rearview mirror system of a vehicle includes an exterior rearview mirror assembly and a light module disposed at the exterior rearview mirror assembly. The light module includes a plurality of illumination sources operable to emit light. The illumination sources are individually controlled responsive to said the input to provide a customized illumination beam emanating from the exterior rearview mirror assembly. The system may include a control that is responsive to the user input to selectively individually energize the light emitting diodes, and the control may individually adjust a duty cycle of each of the light emitting diodes responsive to the user input. The light module may include a ground illumination light source, a backup light source and a turn signal indicator.

49 Claims, 14 Drawing Sheets

(56) References Cited

U.S. PATENT DOCUMENTS

| | | |
|---|---|---|
| 5,669,699 A | 9/1997 | Pastrick et al. |
| 5,671,996 A | 9/1997 | Bos et al. |
| 5,786,772 A | 7/1998 | Schofield et al. |
| 5,823,654 A | 10/1998 | Pastrick et al. |
| 5,929,786 A | 7/1999 | Schofield et al. |
| 5,938,321 A | 8/1999 | Bos et al. |
| 6,002,341 A | 12/1999 | Ohta et al. |
| 6,049,271 A * | 4/2000 | Chu .............................. 340/463 |
| 6,062,613 A | 5/2000 | Jung et al. |
| 6,070,998 A | 6/2000 | Jennings et al. |
| 6,086,229 A | 7/2000 | Pastrick |
| 6,139,172 A | 10/2000 | Bos et al. |
| 6,149,287 A | 11/2000 | Pastrick et al. |
| 6,152,590 A | 11/2000 | Furst et al. |
| 6,158,869 A | 12/2000 | Barnes, Jr. |
| 6,164,805 A | 12/2000 | Hulse |
| 6,168,302 B1 | 1/2001 | Hulse |
| 6,174,016 B1 | 1/2001 | Ponziani |
| 6,176,602 B1 | 1/2001 | Pastrick et al. |
| 6,186,650 B1 | 2/2001 | Hulse et al. |
| 6,193,399 B1 | 2/2001 | Hulse |
| 6,198,409 B1 | 3/2001 | Schofield et al. |
| 6,217,201 B1 | 4/2001 | Hulse |
| 6,227,689 B1 | 5/2001 | Miller |
| 6,238,074 B1 | 5/2001 | Hulse et al. |
| 6,244,734 B1 | 6/2001 | Hulse |
| 6,247,343 B1 | 6/2001 | Weiss et al. |
| 6,260,991 B1 | 7/2001 | Hulse |
| 6,273,579 B1 | 8/2001 | Holloway |
| 6,276,821 B1 | 8/2001 | Pastrick et al. |
| 6,280,069 B1 | 8/2001 | Pastrick et al. |
| 6,291,905 B1 | 9/2001 | Drummond et al. |
| 6,299,333 B1 | 10/2001 | Pastrick et al. |
| 6,304,168 B1 | 10/2001 | Ohta et al. |
| 6,315,419 B1 | 11/2001 | Platzer, Jr. |
| 6,347,880 B1 | 2/2002 | Furst et al. |
| 6,349,450 B1 | 2/2002 | Koops et al. |
| 6,390,529 B1 | 5/2002 | Bingle et al. |
| 6,396,408 B2 | 5/2002 | Drummond et al. |
| 6,416,208 B2 | 7/2002 | Pastrick et al. |
| 6,416,209 B1 | 7/2002 | Abbott |
| 6,477,464 B2 | 11/2002 | McCarthy et al. |
| 6,522,451 B1 | 2/2003 | Lynam |
| 6,523,888 B1 | 2/2003 | Yan et al. |
| 6,550,103 B2 | 4/2003 | Koops et al. |
| 6,561,667 B2 | 5/2003 | Stapf |
| 6,561,685 B2 * | 5/2003 | Weber et al. .................. 362/494 |
| 6,568,839 B1 | 5/2003 | Pastrick et al. |
| 6,577,228 B1 | 6/2003 | Tsuchida et al. |
| 6,582,109 B2 | 6/2003 | Miller |
| 6,616,313 B2 | 9/2003 | Furst et al. |
| 6,623,124 B2 | 9/2003 | Okura |
| 6,669,267 B1 | 12/2003 | Lynam et al. |
| 6,690,268 B2 | 2/2004 | Schofield et al. |
| 6,710,471 B1 | 3/2004 | Schmitz |
| 6,717,712 B2 | 4/2004 | Lynam et al. |
| 6,779,372 B2 | 8/2004 | Arlt et al. |
| 6,793,385 B2 | 9/2004 | Tiesler et al. |
| 6,809,630 B1 | 10/2004 | Dreimann et al. |
| 6,812,823 B2 | 11/2004 | Inaba et al. |
| 6,824,281 B2 | 11/2004 | Schofield et al. |
| 6,847,289 B2 | 1/2005 | Pang et al. |
| 6,848,816 B2 * | 2/2005 | Gilbert et al. .................. 362/494 |
| 6,848,818 B2 | 2/2005 | Huizenga |
| 6,854,870 B2 | 2/2005 | Huizenga |
| 6,871,887 B2 | 3/2005 | Jooss et al. |
| 6,907,643 B2 | 6/2005 | Koops et al. |
| 6,924,735 B2 | 8/2005 | Ueda et al. |
| 6,926,431 B1 * | 8/2005 | Foote et al. ................... 362/494 |
| 6,926,432 B2 | 8/2005 | Rodriguez Barros et al. |
| 6,969,101 B2 | 11/2005 | Lynam et al. |
| 6,977,619 B2 | 12/2005 | March et al. |
| 6,981,789 B2 | 1/2006 | Assinder et al. |
| 7,005,959 B2 | 2/2006 | Amagasa et al. |
| 7,049,940 B2 | 5/2006 | Ieda et al. |
| 7,055,997 B2 | 6/2006 | Baek |
| 7,065,439 B2 | 6/2006 | Sakakura |
| 7,091,836 B2 | 8/2006 | Kachouh et al. |
| 7,097,312 B2 | 8/2006 | Platzer, Jr. |
| 7,104,675 B2 | 9/2006 | Chen |
| 7,121,688 B2 | 10/2006 | Rempel |
| 7,126,456 B2 | 10/2006 | Boddy et al. |
| 7,175,321 B1 | 2/2007 | Lopez |
| 7,175,324 B2 | 2/2007 | Kwon |
| 7,188,963 B2 | 3/2007 | Schofield et al. |
| 7,188,981 B2 | 3/2007 | Rodriguez Barros et al. |
| 7,192,171 B2 | 3/2007 | Rodriguez Barros et al. |
| 7,195,381 B2 | 3/2007 | Lynam et al. |
| 7,199,317 B2 | 4/2007 | Ieda et al. |
| 7,210,715 B2 | 5/2007 | Kobayashi |
| 7,210,798 B2 | 5/2007 | Belliveau |
| 7,244,054 B2 | 7/2007 | Chou |
| 7,255,451 B2 | 8/2007 | McCabe et al. |
| 7,255,464 B2 | 8/2007 | Rodriguez Barros et al. |
| 7,258,471 B2 * | 8/2007 | Rodriguez Barros et al. .............................. 362/494 |
| 7,261,446 B2 | 8/2007 | Thomas |
| 7,270,452 B2 | 9/2007 | Wang |
| 7,274,501 B2 | 9/2007 | McCabe et al. |
| 7,289,037 B2 | 10/2007 | Uken et al. |
| 7,333,021 B2 | 2/2008 | Ieda et al. |
| 7,334,923 B2 * | 2/2008 | Tanaka et al. .................. 362/494 |
| 7,344,284 B2 | 3/2008 | Lynam et al. |
| 7,350,949 B2 | 4/2008 | Meinke et al. |
| 7,407,203 B2 | 8/2008 | Huizenga et al. |
| 7,438,453 B2 | 10/2008 | Saitoh et al. |
| 7,492,281 B2 | 2/2009 | Lynam et al. |
| 7,524,092 B2 * | 4/2009 | Rodriguez Barros et al. .............................. 362/494 |
| 7,581,859 B2 | 9/2009 | Lynam |
| 7,607,809 B2 | 10/2009 | Misawa |
| 7,626,749 B2 | 12/2009 | Baur et al. |
| 7,635,210 B2 | 12/2009 | Metros et al. |
| 7,708,438 B2 * | 5/2010 | Yajima et al. .................. 362/494 |
| 7,748,856 B2 | 7/2010 | Zhao |
| 7,878,693 B2 | 2/2011 | Liesener |
| 7,944,371 B2 | 5/2011 | Foote et al. |
| 7,988,305 B2 | 8/2011 | Itoh et al. |
| 8,058,977 B2 | 11/2011 | Lynam |
| 8,274,226 B1 * | 9/2012 | Sikora et al. .................... 315/77 |
| 2003/0174499 A1 * | 9/2003 | Bohlander .................... 362/240 |
| 2004/0233677 A1 | 11/2004 | Su et al. |
| 2005/0036329 A1 | 2/2005 | Henschel et al. |
| 2005/0105299 A1 * | 5/2005 | Gilbert et al. .................. 362/494 |
| 2005/0117364 A1 | 6/2005 | Rennick et al. |
| 2006/0038418 A1 | 2/2006 | Huizenga et al. |
| 2006/0061008 A1 | 3/2006 | Karner et al. |
| 2006/0226953 A1 | 10/2006 | Shelley et al. |
| 2007/0097698 A1 | 5/2007 | Song et al. |
| 2007/0203618 A1 | 8/2007 | McBride et al. |
| 2007/0206383 A1 | 9/2007 | Broude et al. |
| 2008/0018127 A1 | 1/2008 | Schindler et al. |
| 2008/0061933 A1 | 3/2008 | Ieda et al. |
| 2009/0040306 A1 | 2/2009 | Foote et al. |
| 2009/0115631 A1 | 5/2009 | Foote et al. |
| 2009/0161379 A1 | 6/2009 | Liesener |
| 2010/0321945 A1 | 12/2010 | Lang et al. |
| 2010/0321946 A1 | 12/2010 | Dingman et al. |
| 2012/0062743 A1 | 3/2012 | Lynam et al. |

FOREIGN PATENT DOCUMENTS

| | | |
|---|---|---|
| EP | 1304260 | 4/2003 |
| EP | 1690736 | 8/2006 |
| EP | 1738959 | 1/2007 |
| GB | 2341365 | 3/2000 |
| GB | 2342212 | 4/2000 |
| WO | WO2005035308 | 4/2003 |
| WO | WO2008051910 | 5/2008 |
| WO | WO2011028686 | 3/2011 |

* cited by examiner

| Duty Cycle | | | | | | |
|---|---|---|---|---|---|---|
| Position | LED1 | LED2 | LED3 | LED4 | LED5 | LED6 |
| 1 | 100% | 68% | 36% | 4% | 0% | 0% |
| 2 | 100% | 68% | 36% | 4% | 0% | 0% |
| 3 | 100% | 68% | 36% | 4% | 0% | 0% |
| 4 | 100% | 68% | 36% | 4% | 0% | 0% |
| 5 | 100% | 68% | 36% | 4% | 0% | 0% |
| 6 | 100% | 68% | 36% | 4% | 0% | 0% |
| 7 | 96% | 72% | 40% | 8% | 0% | 0% |
| 8 | 92% | 76% | 44% | 12% | 1% | 0% |
| 9 | 88% | 80% | 48% | 16% | 1% | 0% |
| 10 | 84% | 84% | 52% | 20% | 2% | 0% |
| 11 | 80% | 88% | 56% | 24% | 2% | 0% |
| 12 | 76% | 92% | 60% | 28% | 3% | 0% |
| 13 | 72% | 96% | 64% | 32% | 3% | 0% |
| 14 | 68% | 100% | 68% | 36% | 4% | 0% |
| 15 | 64% | 96% | 72% | 40% | 8% | 0% |
| 16 | 60% | 92% | 76% | 44% | 12% | 1% |
| 17 | 56% | 88% | 80% | 48% | 16% | 1% |
| 18 | 52% | 84% | 84% | 52% | 20% | 2% |
| 19 | 48% | 80% | 88% | 56% | 24% | 2% |
| 20 | 44% | 76% | 92% | 60% | 28% | 3% |
| 21 | 40% | 72% | 96% | 64% | 32% | 3% |
| 22 | 36% | 68% | 100% | 68% | 36% | 4% |
| 23 | 32% | 64% | 96% | 72% | 40% | 8% |
| 24 | 28% | 60% | 92% | 76% | 44% | 12% |
| 25 | 24% | 56% | 88% | 80% | 48% | 16% |
| 26 | 20% | 52% | 84% | 84% | 52% | 20% |
| 27 | 16% | 48% | 80% | 88% | 56% | 24% |
| 28 | 12% | 44% | 76% | 92% | 60% | 28% |
| 29 | 8% | 40% | 72% | 96% | 64% | 32% |
| 30 | 4% | 36% | 68% | 100% | 68% | 36% |
| 31 | 3% | 32% | 64% | 96% | 72% | 40% |
| 32 | 3% | 28% | 60% | 92% | 76% | 44% |
| 33 | 2% | 24% | 56% | 88% | 80% | 48% |
| 34 | 2% | 20% | 52% | 84% | 84% | 52% |
| 35 | 1% | 16% | 48% | 80% | 88% | 56% |
| 36 | 1% | 12% | 44% | 76% | 92% | 60% |
| 37 | 0% | 8% | 40% | 72% | 96% | 64% |
| 38 | 0% | 4% | 36% | 68% | 100% | 68% |
| 39 | 0% | 3% | 32% | 64% | 96% | 72% |
| 40 | 0% | 3% | 28% | 60% | 92% | 76% |
| 41 | 0% | 2% | 24% | 56% | 88% | 80% |
| 42 | 0% | 2% | 20% | 52% | 84% | 84% |
| 43 | 0% | 1% | 16% | 48% | 80% | 88% |
| 44 | 0% | 1% | 12% | 44% | 76% | 92% |
| 45 | 0% | 0% | 8% | 40% | 72% | 96% |
| 46 | 0% | 0% | 4% | 36% | 68% | 100% |
| 47 | 0% | 0% | 4% | 36% | 68% | 100% |
| 48 | 0% | 0% | 4% | 36% | 68% | 100% |
| 49 | 0% | 0% | 4% | 36% | 68% | 100% |
| 50 | 0% | 0% | 4% | 36% | 68% | 100% |

FIG. 6

VEHICLE EXTERIOR MIRROR SYSTEM WITH LIGHT MODULE

CROSS REFERENCE TO RELATED APPLICATION

The present application claims the benefit of U.S. provisional application Ser. No. 61/388,747, filed Oct. 1, 2010, which is hereby incorporated herein by reference in its entirety.

FIELD OF THE INVENTION

The present invention relates to exterior mirrors for vehicles and, more particularly, to a lighted exterior mirror assembly.

BACKGROUND OF THE INVENTION

It is known to provide illumination or light sources at the side of the vehicle, such as to provide security lighting or convenience lighting at the side of the vehicle. For example, such lighting devices are described in U.S. Pat. Nos. 6,349,450; 6,550,103; 5,371,659; 5,669,699; 5,823,654; and 5,497,305, which are hereby incorporated herein by reference in their entireties. Typically, such lighting devices provide illumination along the side of the vehicle and down to the ground at the side of the vehicle.

SUMMARY OF THE INVENTION

The present invention provides an illumination module or device for a vehicle, such as for an exterior rearview mirror assembly. The illumination module may provide a ground illumination function, a turn signal indicator function, a backup lighting or backup assist function and/or a forward lighting and/or forward turn lighting function via a plurality of illumination sources, such as a plurality of light emitting diodes or the like, disposed in the illumination module.

According to an aspect of the present invention, a lighted exterior rearview mirror system of a vehicle comprises an exterior rearview mirror assembly and a light module disposed at the exterior rearview mirror assembly. The light module comprises a plurality of illumination sources operable to emit light. The illumination sources are individually controlled responsive to a user input to provide a user selected or customized illumination pattern or beam direction emanating from the exterior rearview mirror assembly.

The illumination sources may be generally forwardly facing, sidewardly facing and/or rearwardly facing with respect to the direction of forward travel of the vehicle. The illumination sources may comprise light emitting diodes, such as white light-emitting light emitting diodes, such as at least two white light-emitting light emitting diodes or at least four or at least six white light-emitting light emitting diodes. A control may be responsive to the user input to selectively individually energize the light emitting diodes, and the control may adjust a duty cycle of each of the light emitting diodes responsive to the user input.

According to another aspect of the present invention, a multifunction light module is mountable at an exterior rearview mirror assembly and includes at least one illumination source for providing a turn signal indicator, at least one illumination source for providing a rearward backup light, and at least one illumination source for providing ground illumination at the side of the vehicle at which the multifunction light module and exterior rearview mirror assembly are mounted.

The turn signal indicator illumination source or sources are operable responsive to the driver of the vehicle actuating a turn signal of the vehicle and the multifunction light module emits light from the turn signal indicator illumination source or sources generally rearwardly and sidewardly away from the side of the equipped vehicle so that the turn signal indicator is viewable by a driver of another vehicle approaching or overtaking the equipped vehicle at the side of the equipped vehicle, while being substantially not viewable or visible to the driver of the equipped vehicle while the driver is normally operating the equipped vehicle. The rear backup light illumination source is operable responsive to the driver of the equipped vehicle undertaking a reversing maneuver and the multifunction light module emits light (preferably white light) from the rear backup illumination source in a direction generally rearwardly in the direction of reverse travel of the equipped vehicle. The ground illuminating illumination source is operable responsive to a passive entry system or other trigger indicative of the driver approaching the vehicle or opening the door of the vehicle or actuating a key fob or the like, and the multifunction light module emits light from the ground illuminating illumination source or sources generally downward to illuminate a ground area adjacent to the side of the equipped vehicle (and optionally illuminating a portion of the side of the equipped vehicle).

The illumination sources may comprise any suitable illumination sources, such as light emitting diodes or the like, and may comprise colored or white light-emitting light emitting diodes or the like. The multifunction light module may comprise a self-contained multifunction light module that may be readily attached to an existing exterior rearview mirror assembly or that may be incorporated as part of an exterior rearview mirror assembly.

Optionally, the multifunction light module may include at least one forward facing illumination source that is operable responsive to a user input and/or responsive to the driver of the vehicle undertaking a forward turn while driving the vehicle. The multifunction light module emits light from the forwardly directed or forward facing illumination source or sources generally forwardly in a forward direction of travel of the vehicle to illuminate the area forwardly and sidewardly of the equipped vehicle. The forward facing illumination source may comprise a plurality of illumination sources or light emitting diodes and the individual illumination sources may be progressively powered and unpowered to progressively emit illumination from generally forwardly of the vehicle to sidewardly and forwardly of the vehicle responsive to the user input.

These and other objects, advantages, purposes and features of the present invention will become apparent upon review of the following specification in conjunction with the drawings.

BRIEF DESCRIPTION OF THE DRAWINGS

FIG. 6 is a table showing an exemplary duty cycle for the individual illumination sources of the light module of FIG. 4 responsive to a user input position;

DESCRIPTION OF THE PREFERRED EMBODIMENTS

Figure 1:
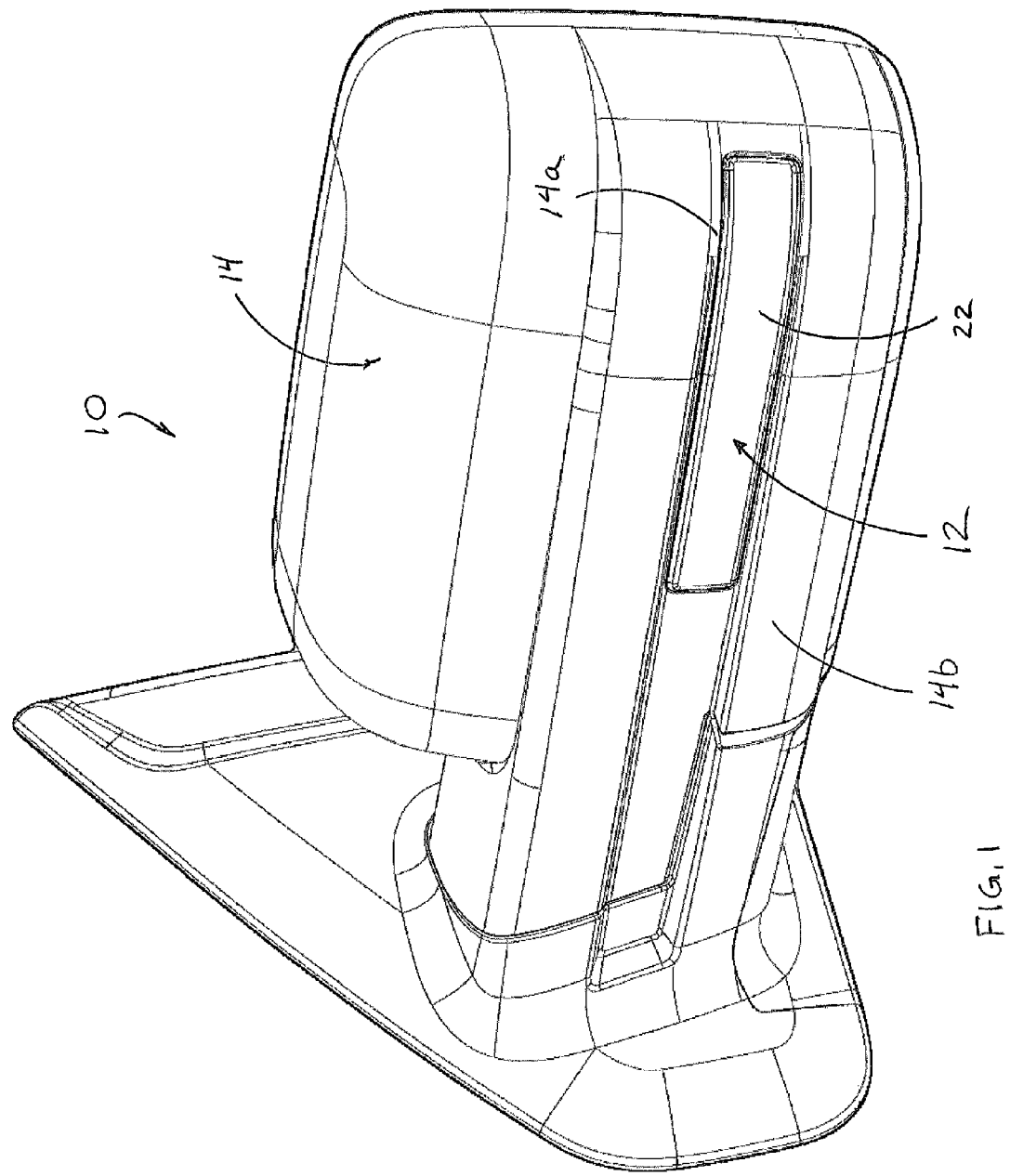
FIG. 1 is a perspective view of a vehicle exterior rearview mirror assembly in accordance with the present invention.
Figure 2:
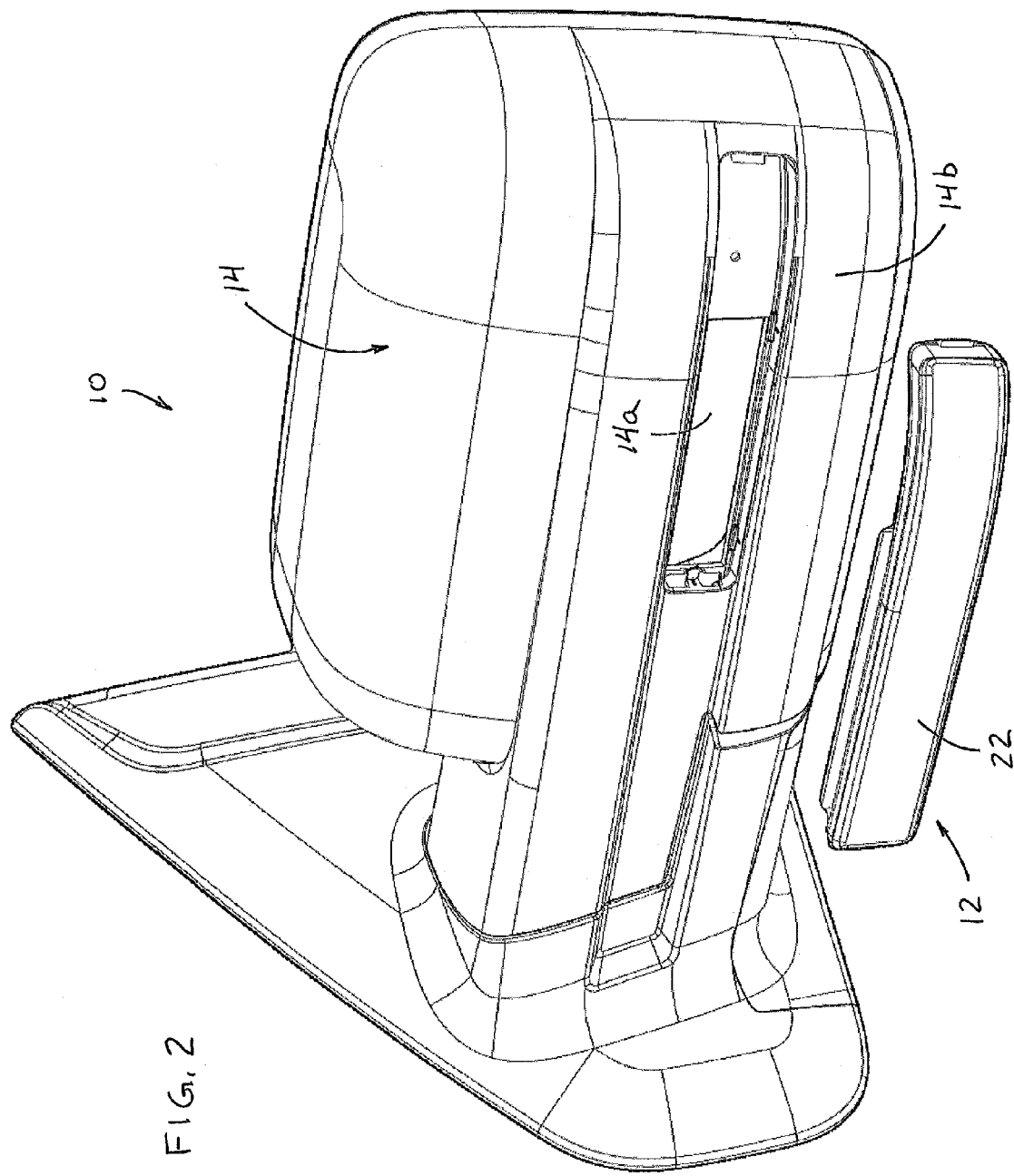
FIG. 2 is an exploded view of the vehicle exterior rearview mirror assembly of FIG. 1, showing the light module removed from the mirror assembly.
Figure 3:
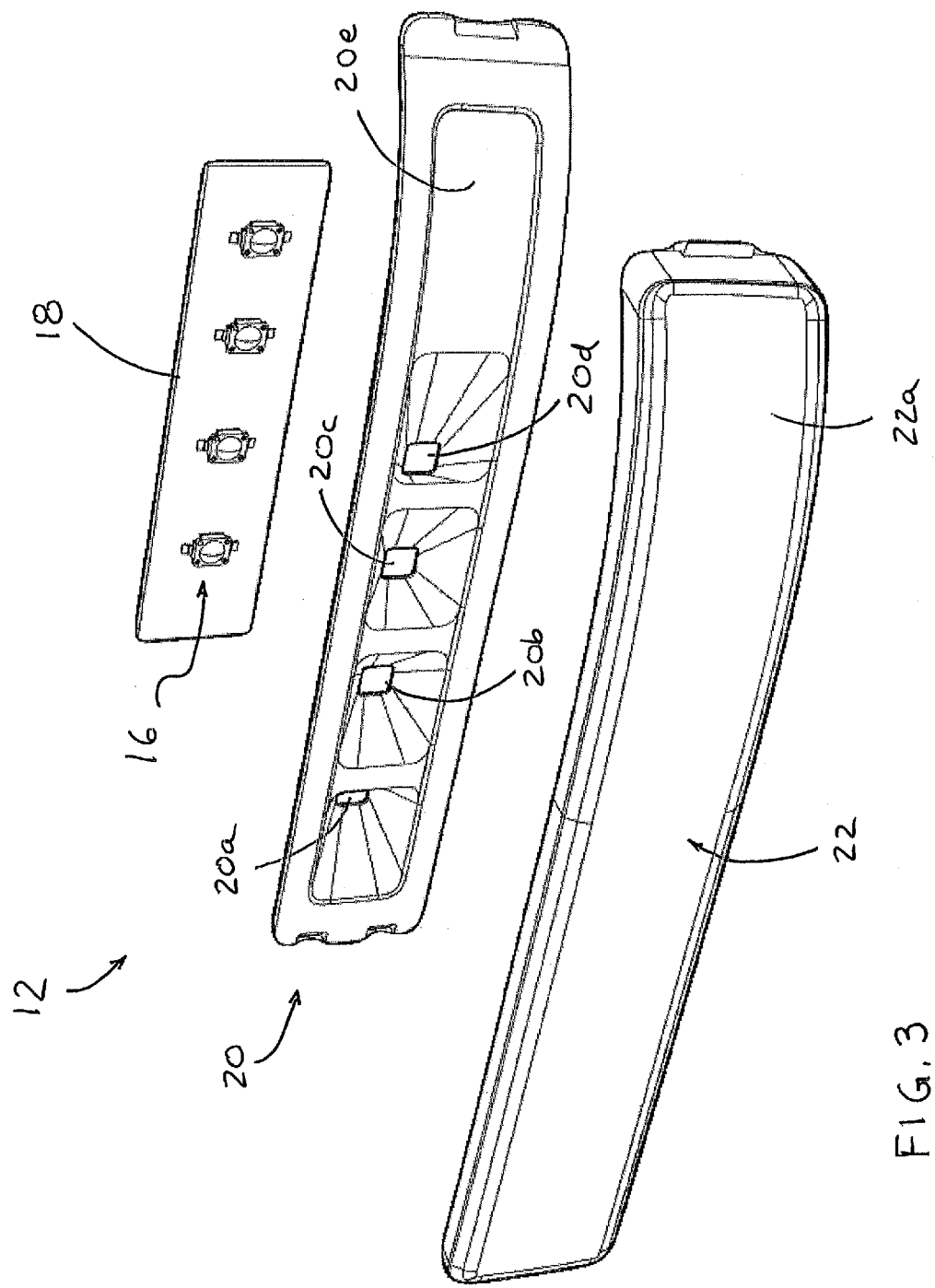
FIG. 3 is an exploded view of the light module of the mirror assembly of FIGS. 1 and 2.

Referring now to the drawings and the illustrative embodiments depicted therein, a vehicle exterior rearview mirror assembly 10 is mountable at a door of a vehicle and includes a light module 12 (FIGS. 1 and 2). Light module 12 is disposed at or received in a recess or aperture 14a of the mirror casing 14. In the illustrated embodiment, the aperture 14a is established or formed at least partially at a forward facing portion 14b of mirror casing 14, which faces generally forwardly in the direction of travel of the vehicle when the exterior rearview mirror assembly 10 is normally mounted at the side of the vehicle. As shown in FIG. 3, the light module 12 includes a plurality of illumination sources 16, such as light emitting diodes or the like, and the light module is configured to emit illumination in a generally forwardly and/or sidewardly and/or rearwardly direction when electrically powered. The illumination sources may be independently and selectively energized at selected or varying intensities to provide a selectable range and intensity of illumination generally forwardly and/or sidewardly and/or rearwardly of the vehicle, such as in response to a user input disposed in the passenger compartment or cabin of the vehicle, as discussed below. The light sources may be used as a selectively directed spotlight or a spotlight that is directed or adjusted responsive to an object detection system or the like or optionally the light sources may function as a supplemental headlight used to improve lighting generally forwardly and at the side of the vehicle when the driver is turning the vehicle while traveling in a forwardly direction, such as when making a turn at an intersection or the like.

In the illustrated embodiment, light module 12 includes four illumination sources 16, which may comprise four (or more or less) white light-emitting light emitting diodes, and which are disposed on a support element 18, such as a plate or circuit board or the like. The light source includes a light guiding or directing or reflecting element 20, which has a plurality of openings 20a-d that generally align with the individual illumination sources and that is configured to guide or direct or reflect illumination emitted by the illumination sources generally forwardly in the direction of travel of the vehicle and/or generally sidewardly of the vehicle. A translucent or visible light-transmitting cover panel or element 22 is disposed over the light guiding element 20 and the support element 18 and illumination sources 16. The cover panel 22 is formed to generally correspond with the contours or curvature of the mirror casing 14 of mirror assembly 10 at the aperture 14a, and allows the illumination emitted by the illumination sources and reflected or directed or guided by the light guiding/directing element 20 (which may comprise a reflector coated or colored plastic or polycarbonate element or a stamped metallic element or the like, or may be the likes of a light pipe or light conduit that acts as a light conductor utilizing the likes of total internal reflection) to pass through the cover panel 22 (which may comprise a transparent or translucent or light transmitting plastic or acrylic or polycarbonate lens or cover element or the like) so as to illuminate the area forward of the mirror assembly and/or of the vehicle. The light guiding element and cover panel may provide or include or cooperate to provide a light piping or guiding function to direct visible light emitted by the illumination sources in a desired or appropriate direction to illuminate the desired area forward and/or sideward of the equipped vehicle.

In the illustrated embodiment, the support element or circuit board 18 may be attached at the rear side or surface of the light guiding element 20, such as via a snap connection or fastenerless connection or the like. Likewise, the cover element 22 may be attached at the front side or surface of the light guiding element 20, such as via a snap connection or fastenerless connection or the like. The light module 12 thus may comprise a unitary module that may be readily attached to the mirror assembly at the aperture 14a of mirror casing 14, such as via a snap connection or fastenerless connection or the like. Optionally, electrical connection may be made between the circuit board 18 (or circuitry or electrical connectors thereat or thereof) and one or more electrical connectors of the mirror assembly or vehicle that are disposed in or at the mirror casing at or near the aperture 14a. The light module 12 thus may be electrically connected to a power source and/or control of the vehicle or mirror assembly, whereby the illumination sources 16 may be powered or unpowered or controlled via a control circuit. Optionally, the light module may be mechanically secured within the pocket or recess or opening at the mirror casing, such as via a snap connection or fastener or the like, and may be electrically connected to a vehicle control system and/or vehicle power source. Optionally, the electrical connection and mechanical connection of the self-contained light module may be made as the light module is snapped or otherwise inserted or mounted or attached to the mirror casing of the mirror assembly, such as by utilizing aspects of the accessory modules described in U.S. Pat. Nos. 6,669,267; 6,969,101; 6,824,281; and/or 7,188,963, which are hereby incorporated herein by reference in their entireties. When snapped or otherwise secured to the mirror assembly, the exterior surface of the light module may substantially correspond to the contours of the mirror casing or housing of the mirror assembly so as to be substantially flush mounted at the mirror assembly to enhance the aerodynamic design of the mirror assembly and to limit or reduce wind noise and the like at the light module and exterior rearview mirror assembly. Optionally, the lighted exterior rearview mirror assembly may comprise a breakaway mirror assembly having a folding or movable portion (that houses or supports the reflective element) and a non-folding part or portion (that attaches to the side of the vehicle equipped with the mirror assembly). In the illustrated embodiment, the light module is disposed at the folding part of the mirror assembly (and is disposed partially within the mirror housing or casing of the folding part), but optionally the light module may be disposed at the non-folding part of the exterior rearview mirror assembly (such as at a lower region of the non-folding mirror part or at a forward region of the non-folding mirror part or the like), while remaining within the spirit and scope of the present invention.

As shown in FIG. 3, the light guiding element 20 has four apertures 20a, 20b, 20c, 20d, with the two central apertures 20b, 20c being configured to direct the emitted illumination (emitted by the respective illumination sources) generally forwardly in a forward direction of travel of the equipped vehicle. The inboard aperture or guiding portion 20a is angled to direct illumination forwardly and generally inboard toward the side of the vehicle, while the outboard aperture or guiding portion 20d is angled to direct illumination forwardly and generally outboard away from the side of the vehicle. Thus, the light module may direct illumination forwardly and sidewardly at the side of the vehicle to provide a wide band of illumination at the respective side of the vehicle to assist the driver in undertaking the forward turning maneuver.

Optionally, and desirably, the individual light sources may be individually controlled or powered to provide enhanced lighting at a desired area or region and reduced lighting at other areas. For example, if it is desired to provide greater illumination outboard away from the side of the vehicle, the outboard illumination source at outboard light guiding portion 20d may be activated or operated or energized at an increased power level and the inboard illumination source at inboard light guiding portion 20a may be deactivated or operated or energized at a reduced power level (and optionally the intermediate or central illumination sources at the central light guiding portions 20b, 20c may be powered or not powered depending on the overall light intensity desired for the particular lighting application).

Figure 4:
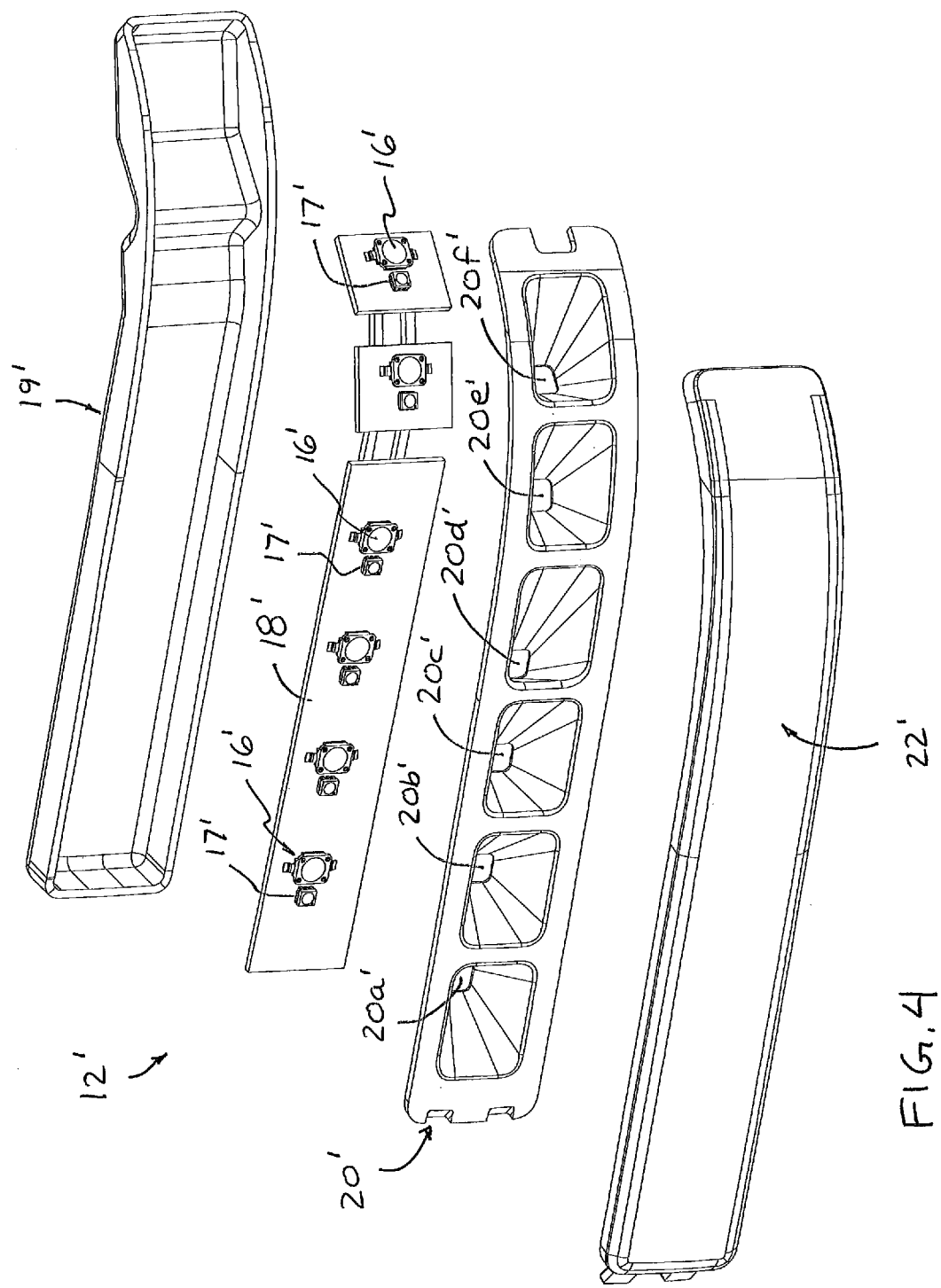
FIG. 4 is an exploded view of another light module of the present invention.

Optionally, and such as shown in FIG. 4, the light module 12' may include six illumination sources 16' (such as at least six white light-emitting light emitting diodes or the like) disposed on disposed on a support element 18', such as a plate or circuit board or the like or such as multiple circuit board segments electrically connected together via electrically conductive leads or wires or the like (with the circuit element mounted at or supported at a base element or receiving element or housing element 19' (which may comprise a plastic or polycarbonate element or the like) of light module 12'. The light module 10' includes a light guiding or directing or reflecting element 20', which has a plurality of openings 20a'-f' that generally align with the individual illumination sources 16' and that is configured to guide or direct or reflect illumination emitted by the illumination sources generally forwardly in the direction of travel of the vehicle and/or generally sidewardly of the vehicle. A translucent or visible light-transmitting cover panel or element 22' is disposed over the light guiding element 20' and the support element 18' and illumination sources 16'. The cover panel 22' is formed to generally correspond with the contours or curvature of the mirror casing of the mirror assembly, such as in a similar manner as discussed above with respect to light module 12 and mirror assembly 10.

Optionally, the light module 10' may also provide a turn signal indicator function and may include a plurality of amber (or other desired color) illumination sources 17' (such as amber light-emitting light emitting diodes or the like). The illumination sources 17' may be activated or energized responsive to actuation of a turn signal of the vehicle, such as in a similar manner as known turn signal indicators. For example, the illumination sources 17' may be actuated or energized simultaneously and intermittently to flash together or the may be sequentially intermittently actuated or energized to provide an appearance of an outward moving light, in response to actuation of the vehicle turn signal. For example, the illumination sources of the light module may be progressively operated to provide progressive activation of the illumination sources from an inboard-most illumination source of the light module to an outboard-most illumination source of light module. The illumination sources 17' are disposed on the circuit element or support element 18' next to respective ones of the illumination sources 16' and may emit light through respective openings 20a'-f' of light directing element 20', or the turn signal indicator illumination sources 17' may be otherwise disposed at the circuit element or support element and may emit light through other openings of a light directing element, while remaining within the spirit and scope of the present invention. Optionally, the illumination sources 16' may comprise dual-dye light emitting diodes and, responsive to a selected voltage or signal, may emit white light (such as responsive to a signal generated in response to actuation of the user input in the vehicle) or may emit amber (or other desired color) light (such as responsive to a signal generated in response to actuation of the vehicle turn signal actuator). Optionally, for example, the light module may operate in conjunction with or corresponding to a selected custom color for the interior lighting of the vehicle (such as MYCOLOR® offered by Ford Motor Company), whereby the illumination color emitted by the illumination sources of the exterior mirror light module may be selected or customized by the user to a desired color or color combination.

The illumination sources 16, 16' (such as the four or six or any other desired or appropriate number of white light-emitting light emitting diodes or the like) may be controlled using pulse width modulation (PWM). Optionally, by varying the duty cycle of the individual illumination sources, the light module, when activated, can create the impression that the light is begin adjusted horizontally (such as via individual control of the intensities of the individual illumination sources). Optionally, it is envisioned that the light module may be steerable or aimed via mechanical means, such as via adjusting the orientation of the individual illumination sources or via moving or adjusting the reflector or light guiding element or the like, such as in response to a user input as discussed below.

Figure 5:
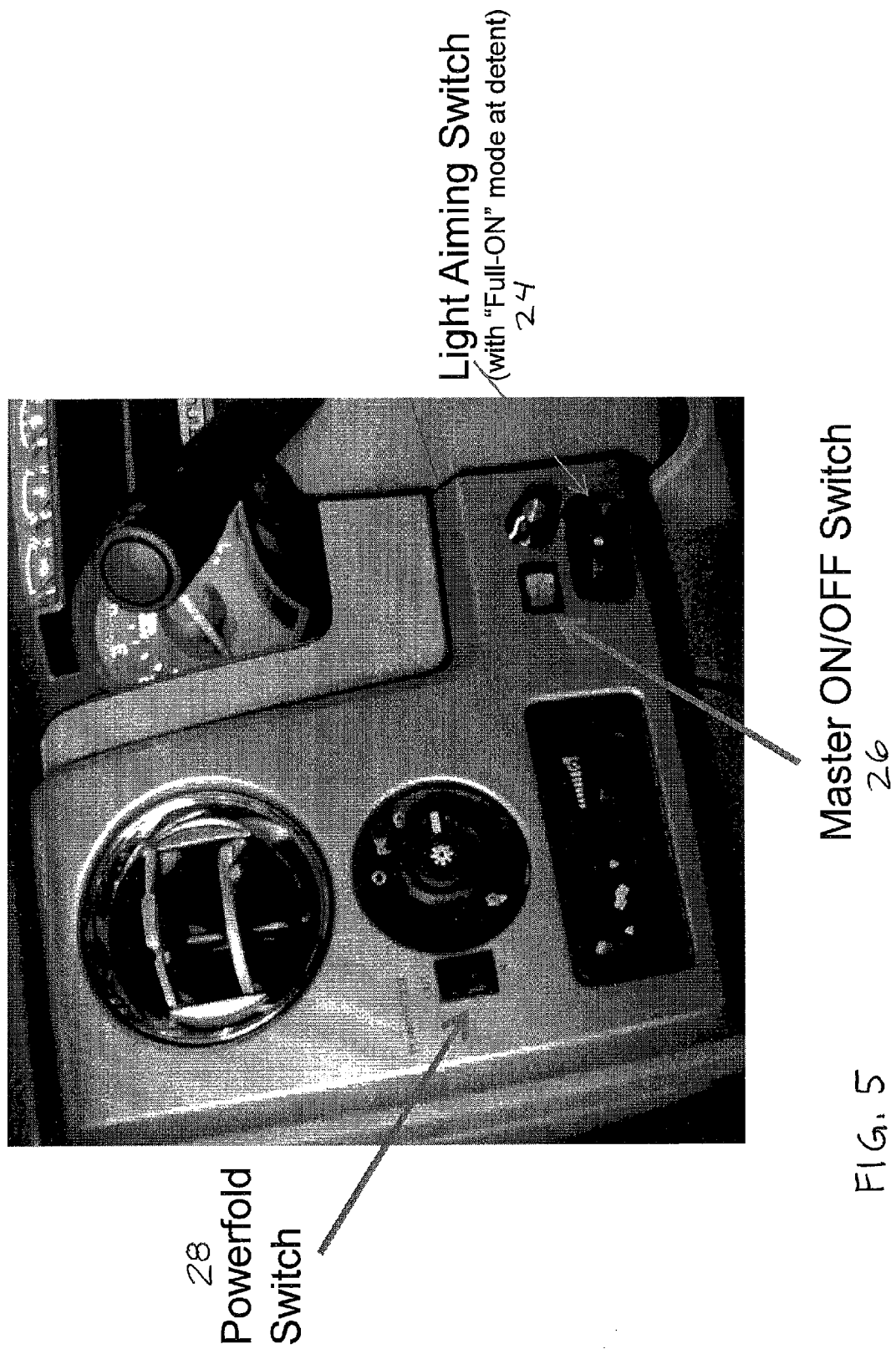
FIG. 5 is a perspective view of a user input suitable for use with the light module of the present invention.

In the illustrated embodiment, and with reference to FIG. 5, the light module 12, 12' may be responsive to a user input 24 within the vehicle cabin, such as at the instrument panel of the vehicle. As shown in FIG. 5, the user input 24 may comprise a dial or knob or electrical switch that is adjusted to a number of different settings. Thus, when the light module is activated (such as via actuation of an "on/off" switch or input 26 in the vehicle cabin), the user or driver of the vehicle may control or adjust the user input 24 to select a desired or appropriate lighting configuration or illumination pattern emitted by the light module 12 or 12'. For example, the user input 24 may comprise a dial or knob that is rotated by the user in either direction from a center or "full on" setting to either the right direction (to illuminate the inboard LEDs of the driver side mirror more than the outboard LEDs of the driver side mirror) or the left direction (to illuminate the outboard LEDs of the driver side mirror more than the inboard LEDs of the driver side mirror). The user thus can pan the principal illumination beam left to right and right to left via adjustment of the knob or dial or user input. For example, and with reference to FIG. 6, the user input may be selectively adjusted to any one of about 50 positions (or more or less depending on the particular application and desired adjustability), whereby each LED or illumination source may be energized to a predetermined level responsive to the particular setting or position of the user input. The lighting system may include a control or microprocessor on the circuit board of the light module or elsewhere in or at the mirror or vehicle, and the control may be responsive to the signal from the user input and operable to power one or more of the illumination sources in accordance with a the selected input or setting or position of the user input. Optionally, the user input may also be set to a "full on" position or setting whereby all four or six illumination sources (or any other number of illumination sources, such as more than two LEDs, such as eight or ten LEDs, but preferably less than about 20 LEDs, depending on the particular application) may be operated or energized at or near a 100 percent level or intensity.

Optionally, it is envisioned that the light module may include a two dimensional array of illumination sources (such as two or more rows of illumination sources), and the user input may comprise a toggle or joystick type control, whereby a user may direct or adjust or control or aim an illumination pattern or principal illumination beam to direct light upward and/or downward as well as forward/sideward, to provide a desired or selected illumination pattern by the vehicle. The joystick control may be similar to a control or input for adjustment of the exterior mirror reflective element, and may be at or near the exterior mirror controls so that the user may readily understand what control function the control or input provides. Optionally, a light module may be disposed at each of the driver side and passenger side mirror assemblies, and each light module may be associated with a respective control or user input or a single user input or control may selectively control a selected one of the light modules (such as via a selection switch similar to the selection switches used to select which reflective element actuator is controlled by a mirror adjustment control).

Figure 7:
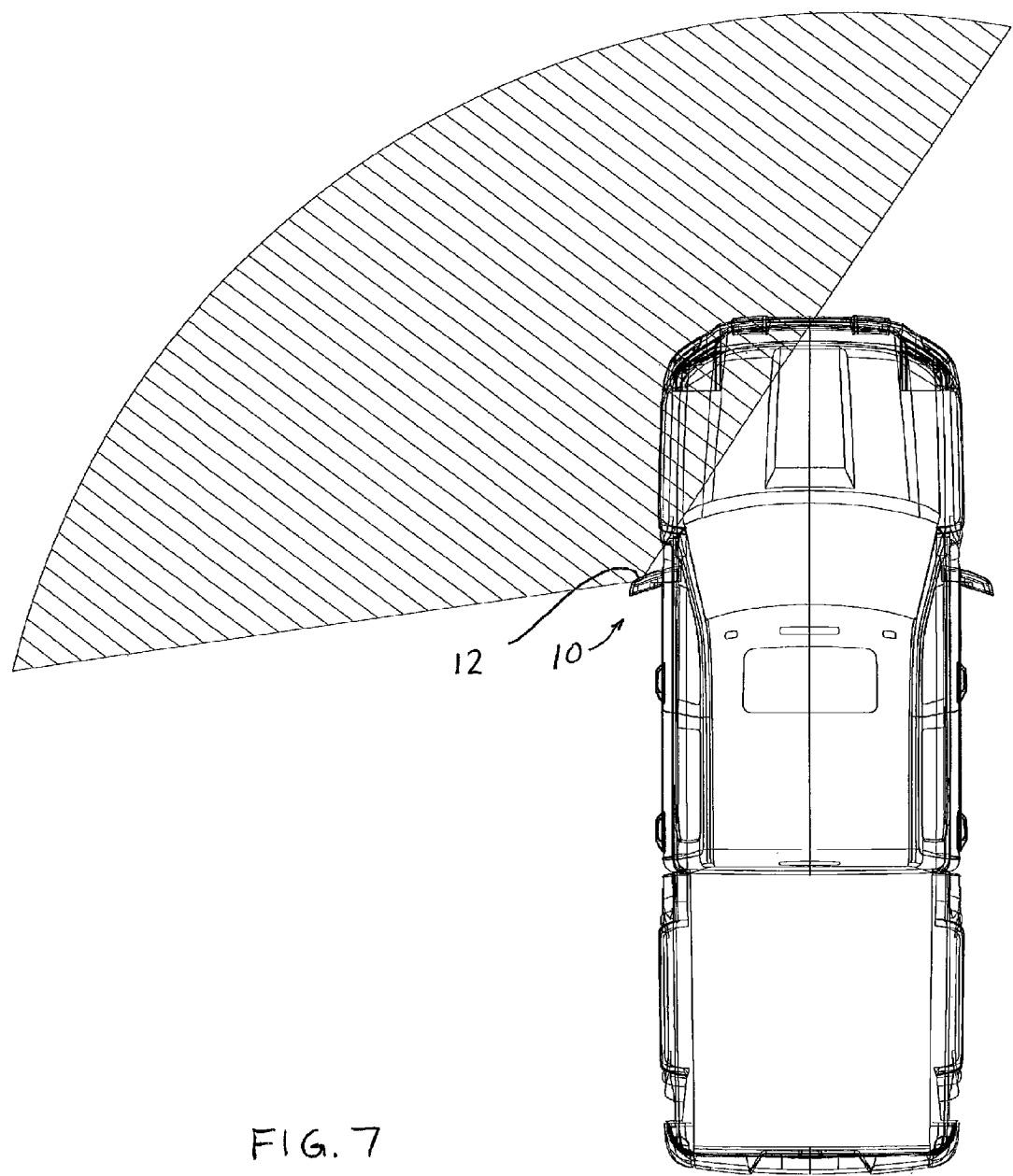
FIG. 7 is a plan view of a vehicle, showing the area that can be illuminated by the light module of the present invention.

Thus, the illumination sources of the light module 12, 12' may be selectively actuated or energized to provide a desired illumination pattern at the side and forwardly of the vehicle (so that the user of the vehicle may selectively activate and "steer" or aim a principal illumination beam toward a desired or selected or targeted area). As shown in FIG. 7, the illumination pattern when all of the illumination sources are powered may encompass a region that includes a forward portion of the vehicle and that extends partially rearward of the rearview mirror at which the light module is installed (such as a range of at least about 120 degrees, more preferably at least about 130 degrees with four LEDs and at least about 155 degrees with six LEDs, such as from about 10 degrees or more rearward to about 20 degrees or more beyond the longitudinal axis of the vehicle). Actuation or energization of fewer than all of the illumination sources may adjust the illumination pattern to encompass any subset or sub-region of the illumination area shown in FIG. 7, depending on the desired illumination direction and intensity for the particular application. The light module and lighting system of the present invention thus may provide a selectable and adjustable and customizable lighting pattern for a driver or user of the vehicle so as to provide a desired illumination pattern for any given situation. For example, the lighting system of the present invention may be highly suitable for use in camping applications (such as to provide or direct light to assist in late night setting up of a tent or camp fire or the like) or farming applications (such as to provide or direct light to assist in herding animals or land surveillance or the like) or construction applications (such as to provide or direct light to assist in road repair or land surveillance or the like) or vehicle maintenance applications (such as to provide or direct light to assist in changing a tire or general vehicle inspection or the like) or tailgating or the like. The driver of the vehicle thus may readily adjust the control or user input within the vehicle to adjust or select or customize the intensity of the beam and/or the pointing and/or principal axis of the beam so as to provide, for example, localized illumination/interrogation of a given object and/or location and/or scene exterior of the vehicle in an up to 180 degree arc relative to the side of the equipped vehicle.

The present invention thus provides a customizable or adjustable or user controllable spotlight at the exterior rearview mirror assembly, such that a user, sitting in the vehicle cabin, can direct illumination towards a desired or targeted region or area or object generally forwardly and/or sidewardly of the vehicle. The aiming and/or illumination and/or type of pattern or illumination beam can be user selected or customized or may be responsive to an object detection or other auto detection device (such as an imaging sensor or camera, or radar sensor, or ultrasonic sensor, or infrared sensor or the like) so as to provide enhanced illumination of a detected object to enhance imaging of a detected object and/or identification of a detected object forwardly and/or sidewardly of the vehicle.

Figure 8:
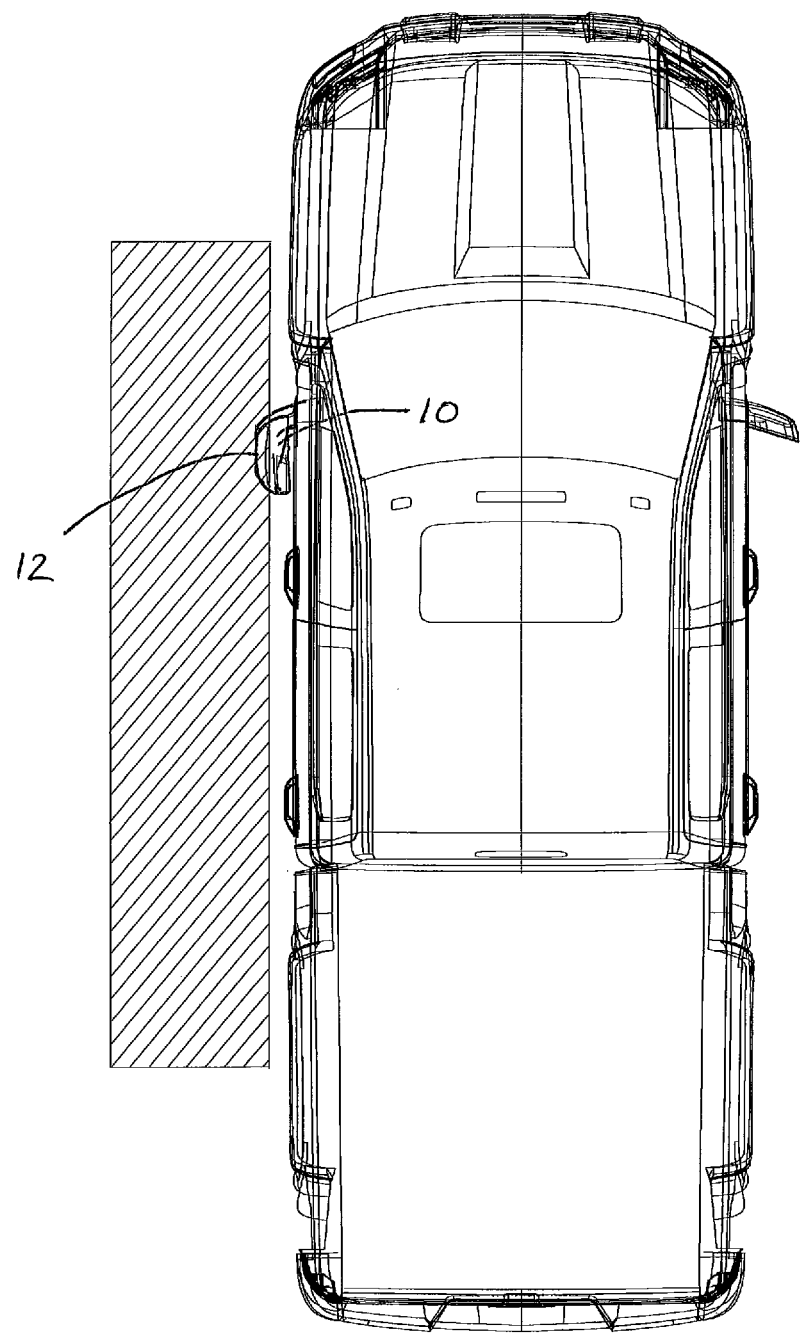
FIG. 8 is another plan view of the vehicle of FIG. 7, showing the area that can be illumination by the light module, when the exterior mirror is in its folded in position.

The user selected illumination range or light pattern may be selected or customized to any desired pattern or intensity within the illumination range such as shown in FIG. 7, or may be directed sideward of the vehicle when the light module is disposed in a foldable or breakaway mirror assembly (such as a powerfold mirror assembly or the like) and when the mirror is in its folded orientation. For example, and with reference to FIG. 8, the light module 12, 12' may provide a side area illumination feature when the exterior mirror (such as a powerfold exterior mirror) is folded inward to its folded orientation. When the mirror is folded in this manner, the illumination sources of the light module may all be actuated or energized to a desired or selected intensity to provide a side area illumination pattern along the side of the vehicle. The light module may provide such a side area lighting feature automatically in response to a passive entry system or key fob signal or the like, so as to provide side area illumination when the driver of the vehicle approaches the vehicle. For example, when the system detects the approach of the driver, such as responsive to a passive entry system or responsive to receiving a key fob signal or the like, the system may fold or pivot the mirror head to the folded orientation and actuate the illumination sources of the light module, in order to provide illumination at the side of the vehicle. Optionally, the system may only provide such side illumination when the system also detects a low ambient lighting condition, such as responsive to an ambient light sensor of the mirror assembly or vehicle. Optionally, the system may provide such a side illumination feature responsive to user inputs in the cabin of the vehicle, such as via a powerfold actuator switch 28 (FIG. 5) and user inputs 24 and 26, discussed above.

Figure 9:
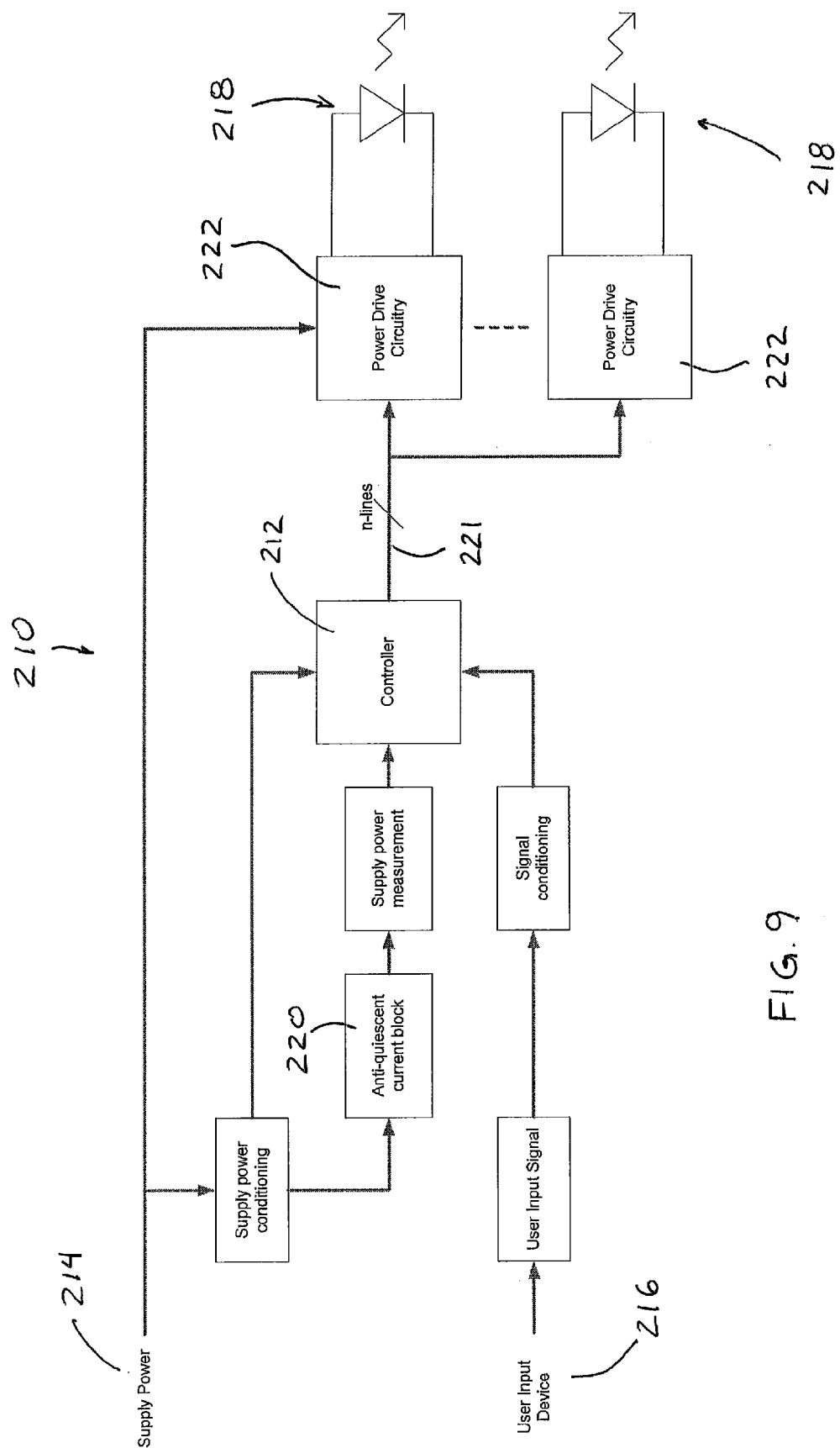
FIG. 9 is a block diagram of a control system for controlling the light module in accordance with the present invention.

Optionally, and with reference to FIG. 9, a control circuit or control system 210 is operable to control the illumination sources or light emitting diodes of the light module of the present invention, such as to control powering/unpowering/dimming of the illumination sources in the manners described above. As shown in FIG. 9, the control system 210 includes a controller or microcontroller 212 that receives power from a power source or supply power 214 and that receives an input from a user input device 216 (such as similar to user input 24, discussed above), and is operable to power and/or control the illumination sources 218 of a light module of the present invention (where illumination sources 218 in FIG. 9 are representative of any of illumination sources 16, 16' discussed above, or of any of the illumination sources discussed below, or the like). Although shown as two illumination sources 218, clearly the control system 210 may selectively energize and control more illumination sources, such as four or six illumination sources as discussed above or any other number of illumination sources depending on the particular application of the light module. The power supply 214 provides power to the controller 212 and the controller provides the desired or selected power level to the illumination sources 218, and the power feed to the controller 212 may include supply power conditioning, such as an anti-quiescent current block 220 or the like (where the control system may limit drawing of current from the power source when the light module is not in use so as to avoid a trickle drain off of the vehicle power source or battery).

The controller 212 may receive one or more inputs or signals and may process the inputs or signals and control the illumination sources 218 accordingly (such as via respective power and/or control lines or wires 221 and respective power drive circuitry 222 or the like). For example, the controller 212 may receive a signal indicative of actuation of a user input device 216, such as actuation of the user input 24, discussed above, or actuation of a turn signal or actuation of the headlamps or high beam headlamps of the vehicle or the like, or the controller may receive a signal from other sources, such as an ambient light sensor or steering angle sensor or the like. Responsive to such signals or inputs, the controller 212 may energize or power one or more of the illumination sources 218 and/or may increase or decrease the intensities of one or more of the illumination sources, so as to provide the desired lighting pattern or illumination for the particular condition or application indicated by the input or signal. Optionally, for example, the input may be indicative of a forward turning maneuver of the vehicle when the headlamps of the vehicle are on, and the controller may then progressively activate or power the forward facing illumination sources to provide the desired "moving" illumination pattern as the vehicle is driven through its forward turn, such as described above. The controller may be incorporated in the light module as part of the self-contained light module, where the light module circuitry is electrically connected to the power source feed and user input feed or feeds when the light module is attached to or mounted at the exterior rearview mirror assembly of the vehicle.

Optionally, the exterior rearview mirror assembly may include a camera or imaging sensor that may be part of a multi-camera system, such as an object detection system or a surround view or "bird's eye view" display system or a Japan View™ vision system or the like (now common in exterior mirrors used in Japan where a video camera is located in the exterior mirror assembly at the side of a vehicle and viewing generally downwardly to allow the driver of the vehicle to view on an interior-cabin mounted video screen whether the likes of a child might be present in the blindzone to the side of the vehicle), such as by utilizing aspects of the vision systems described in PCT Application No. PCT/US10/25545, filed Feb. 26, 2010, and/or PCT Application No. PCT/US10/47256, filed Aug. 31, 2010 and published Mar. 10, 2011 as International Publication No. WO 2011/028686, and/or U.S. provisional application Ser. No. 61/466,138, filed Mar. 22, 2011; Ser. No. 61/452,816, filed Mar. 15; 2011; Ser. No. 61/426,328, filed Dec. 22, 2010; and/or Ser. No. 61/540,256, filed Sep. 28, 2011, which are hereby incorporated herein by reference in their entireties). Thus, the multi-camera vision system may provide a video display of images captured by an exterior mirror-mounted camera and may function to detect the presence of an object or child or the like at the side of the vehicle (and/or forwardly and/or rearward of the vehicle).

The light module of the present invention can be used in conjunction with such a vision system to have its principal illumination beam directed towards the area within the field of view of the camera to enhance imaging and/or to enhance detection and/or identification and/or interrogation of objects in the camera's field of view generally at the side of the vehicle and optionally forwardly and/or rearwardly of the vehicle.

Optionally, the illumination sources may be automatically powered or activated or controlled in response to activation of the vehicle headlamps and/or in response to a signal indicative of the vehicle turning (such as a steering wheel angle or the like). For example, the illumination sources of a light module in a drivers side exterior rearview mirror assembly may be automatically actuated in response to a condition that involves (a) the headlights of the vehicle being on, (b) the vehicle being in a forward gear or the gear actuator being in a forward gear position, and (c) the vehicle undertaking a forward left turn or the driver actuating a turn signal of the vehicle. Optionally, the illumination sources may be actuated in response to an ambient light sensor that generates a signal indicative of the ambient light at the vehicle being below a threshold level (such that the illumination sources are activated in low lighting conditions during a vehicle forward turning maneuver even if the headlamps are not activated). Such a control system thus may automatically activate or power either light module only when the conditions are appropriate for providing illumination at the respective side of the vehicle so as to assist the driver in undertaking the forward turning maneuver. Optionally, the illumination sources may also or otherwise be powered or activated or controlled in response to a user input or the like, such as a switch or button or the like in the vehicle cabin that is accessible by and actuatable by the driver of the vehicle when the driver is normally operating the vehicle.

Optionally, the illumination sources 16 (such as the four or six or any other desired or appropriate number of white light-emitting light emitting diodes or the like) may be controlled using pulse width modulation (PWM). Optionally, by varying the duty cycle of the individual illumination sources, the light module, when activated, can create the impression that the light is begin adjusted horizontally (such as via individual control of the intensities of the individual illumination sources). For example, at the initial onset of a turn towards a particular side of the vehicle, the inboard illumination source may be initially powered at a greater intensity relative to the central and outboard illumination sources (and optionally one or more of these illumination sources may initially not be activated or powered), and then as the turn progresses (such as responsive to an increase in steering wheel angle or the like), the inboard illumination source may be dimmed while the intensities of the central illumination sources are increased and as the turn further progresses, the outboard illumination intensity may be increased, such that, to a person viewing the illumination module at the mirror assembly, the illumination module appears to have a light source that is adjusted horizontally from an inboard directing orientation to an outboard directing orientation. Optionally, the light module and/or illumination sources may have a dimming control feature or function, such that the illumination sources, when powered or activated, are ramped up or progressively powered up to their full illumination states, and when unpowered or deactivated, are ramped down or dimmed or progressively powered down to their deactivated states. Such a dimming control feature provides a smoother transition when progressively illuminating or powering the illumination sources to give the appearance of movement of an illumination source generally horizontally during the turning maneuver.

Thus, the light module may comprise a cornering light module or assembly to provide illumination generally forwardly and sidewardly of the vehicle to provide enhanced illumination during turning maneuvers of the vehicle. The side lighting functions to improve the vision of the driver of the vehicle when turning the vehicle around a corner or curve in the road. The light module may operate in conjunction with the respective turn signal so as to be activated when the turn signal at that side of the vehicle is activated. The light module may provide a constant illumination at the side of the vehicle while the turn signal flashes. Optionally, the light module may provide a sideward illumination in response to the high beams of the vehicle being activated, in order to provide additional lighting of the road or shoulder sidewardly of the vehicle and rearward of the area encompassed by the front headlights when in their high beam state. In such an application, the sideward lighting function may be deactivated when the headlights are in their low beam state.

Optionally, the illumination sources (such as a row of lights with some of the lights illuminating further sidewardly than some of the other lights) may illuminate in a progressively outward direction depending on the position or steering angle of the steering wheel or front wheels/tires of the vehicle, and then the lights may progressively deactivate in the opposite direction as the steering wheel and/or wheels/tires are turned back to a center or straight orientation. Thus, the lights may illuminate a greater sideward area in response to a detection of the vehicle undergoing a sharper turn so as to enhance the viewing by the driver of the area to the side of the vehicle and toward where the vehicle is being steered, while limiting sideward illumination when the vehicle is being driven in a generally straight or slightly curved path.

Optionally, the illumination sources of the light module may emit illumination in response to other triggering or activating devices or events, such as responsive to a passive entry system or the like of the vehicle so as to provide illumination at the side of the vehicle when the driver approaches the vehicle or touches or moves the door handle of the vehicle door or actuates a remote keyless entry module or passive entry device of the vehicle or inserts a key into a keyhole at the door or door handle or when a motion detector of the vehicle detects a motion at the vehicle, or the like. Optionally, and desirably, the illumination source is deactuatable following a period of time after such an actuation of the illumination source. Optionally, the light module and/or illumination source or sources may have a dimming control feature or function, such that the illumination source, when activated, is ramped up or progressively powered up to its full illumination state, and when deactivated, is ramped down or dimmed or progressively powered down to its deactivated state.

The illumination source may comprise any suitable illumination source, such as one or more light emitting diodes (LEDs), such as white light-emitting LEDs or high intensity power LEDs (such as the types described in U.S. Pat. Nos. 7,195,381 and/or 6,690,268, which are hereby incorporated herein by reference in their entireties) or organic light emitting diodes (OLEDs) or the like. The illumination source may comprise a substantially white light emitting illumination source, or may comprise a colored light emitting illumination source (or a white light emitting illumination source may emit light that passes through a color filter or the like) to provide color illumination (such as blue or amber or other color as desired) at the mirror assembly and ground area depending on the particular application of the mirror assembly and illumination module.

The light module may comprise a small, self-contained module that includes the outer cover or casing that substantially encases the illumination source and circuitry of the light module, and may utilize aspects of the illumination modules described in U.S. patent application Ser. No. 12/596,891, filed Oct. 21, 2009, which is hereby incorporated herein by reference in its entirety. The cover provides an outer wall that substantially corresponds to the contours of the mirror assembly at the light module such that the mirror assembly has a substantially continuous outer surface or wall at the light module. The light module and housing or cover and/or mirror casing may be substantially sealed so as to be substantially impervious to water, dirt, debris and the like, so that the light module is well suited for the exterior application at the vehicle exterior rearview mirror assembly. The outer wall or walls of the cover are substantially flush with the outer surface and contours of the mirror casing of the mirror assembly, and may be colored so as to substantially match or contrast the color of the mirror casing, depending on the particular application of the mirror assembly and light module.

The housing or cover panel of the light module may be at least partially or substantially translucent or transparent at least at the regions corresponding to or aligned with the light directing portions 20*a*-*d* such that illumination emitted via the illumination sources is transmitted through the cover panel and toward the front area forward and sidewardly of the mirror assembly at the side of the vehicle. Optionally, the cover panel may provide a diffusing optic or diffusing effect or frosting to diffuse or spread out the emitted light to provide substantially uniform illumination and to limit or substantially preclude bright spots when the illumination sources are activated. Optionally, an outboard curved portion 22*a* of cover 22 may be disposed at or over a recess or light guiding or piping portion 20*e* of light guiding element 20, and light emitted by the outboard illumination source at opening 20*d* may be guided or directed laterally outward along the light guiding portion or recess 20*e* and in a direction generally forwardly and sidewardly away from the exterior mirror assembly and the side of the equipped vehicle.

Optionally, and desirably, the cover panel may be overmolded over the illumination source or sources and circuitry to provide a substantially sealed and substantially water impervious illumination module. For example, a housing or cover panel may be overmolded over and around a metal stamping or stamped circuit element or plate with the illumination source or sources (such as LEDs or the like) fastened thereto or otherwise established thereon, or the housing may be overmolded over and around a printed circuit board or element with the illumination sources established thereon.

The light module may be located or established at or in the exterior surface or wall of the exterior mirror casing, such as in a metallic or plastic or polymeric portion of the mirror casing. The cover panel of the light module may have any desired or suitable exterior finish, such as a class A surface finish, and may be colored or finished to any desired or suitable finish, such as a black or dark or colored finish (or the material may be black or dark or colored polymeric or metallic material). Optionally, the cover panel may have a chrome finish or brushed aluminum finish or the like, such that illumination is provided through the chrome or brushed aluminum finished wall or structure of the minor assembly.

Figure 10:
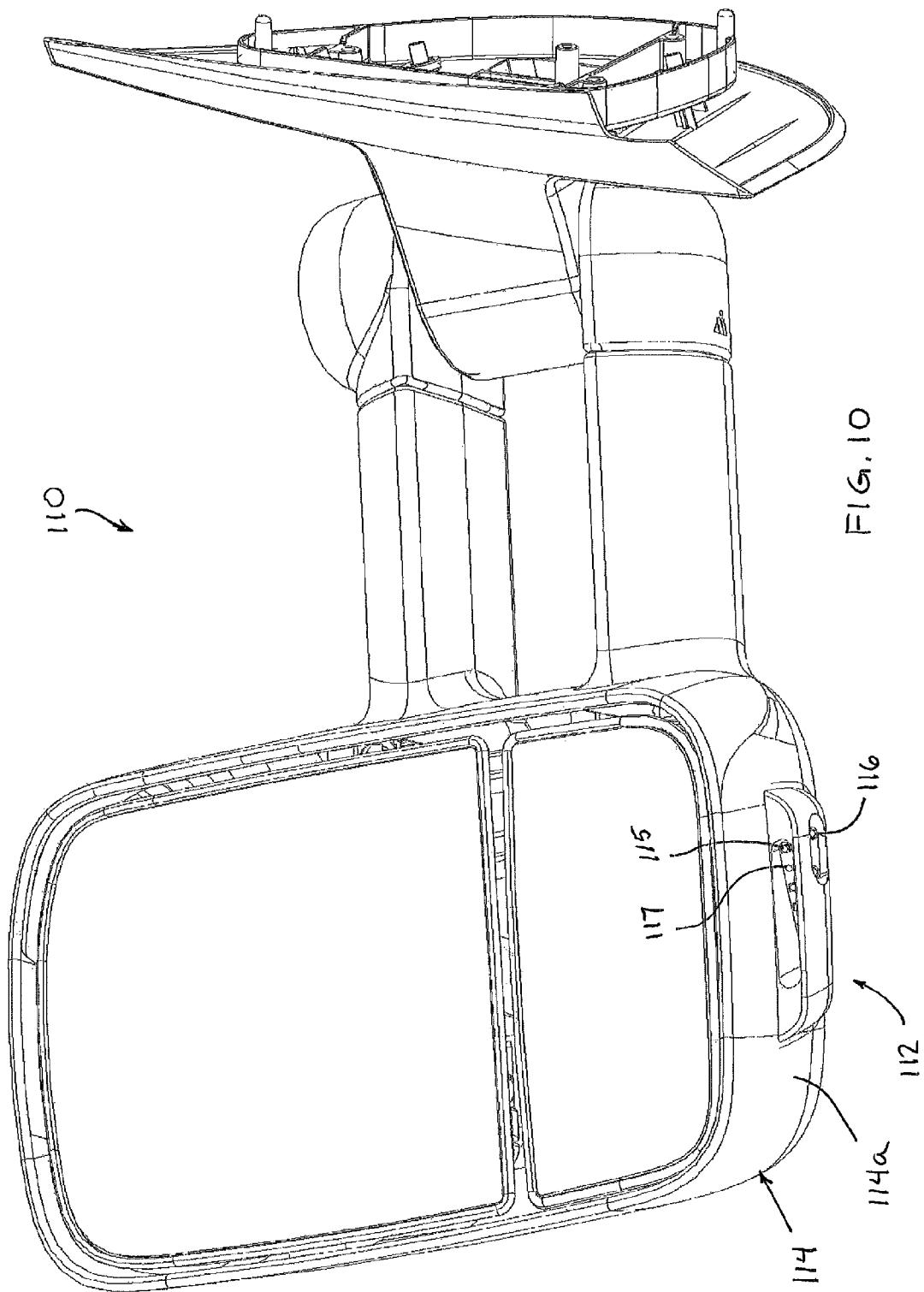
FIG. 10 is a perspective view of another vehicle exterior rearview mirror assembly in accordance with the present invention.
Figure 11:
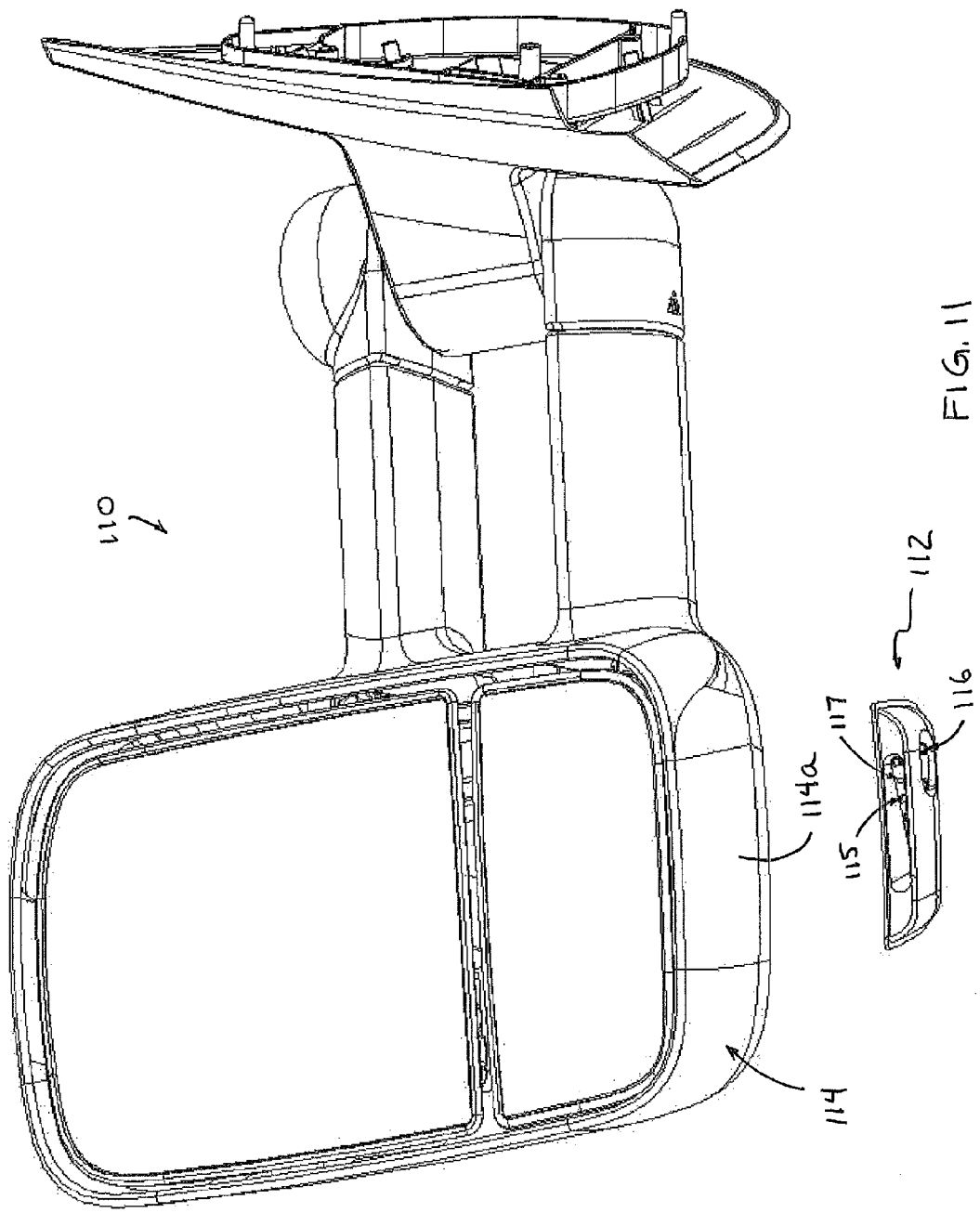
FIG. 11 is an exploded view of the vehicle exterior rearview mirror assembly of FIG. 10, showing the light module removed from the mirror assembly.
Figure 12:
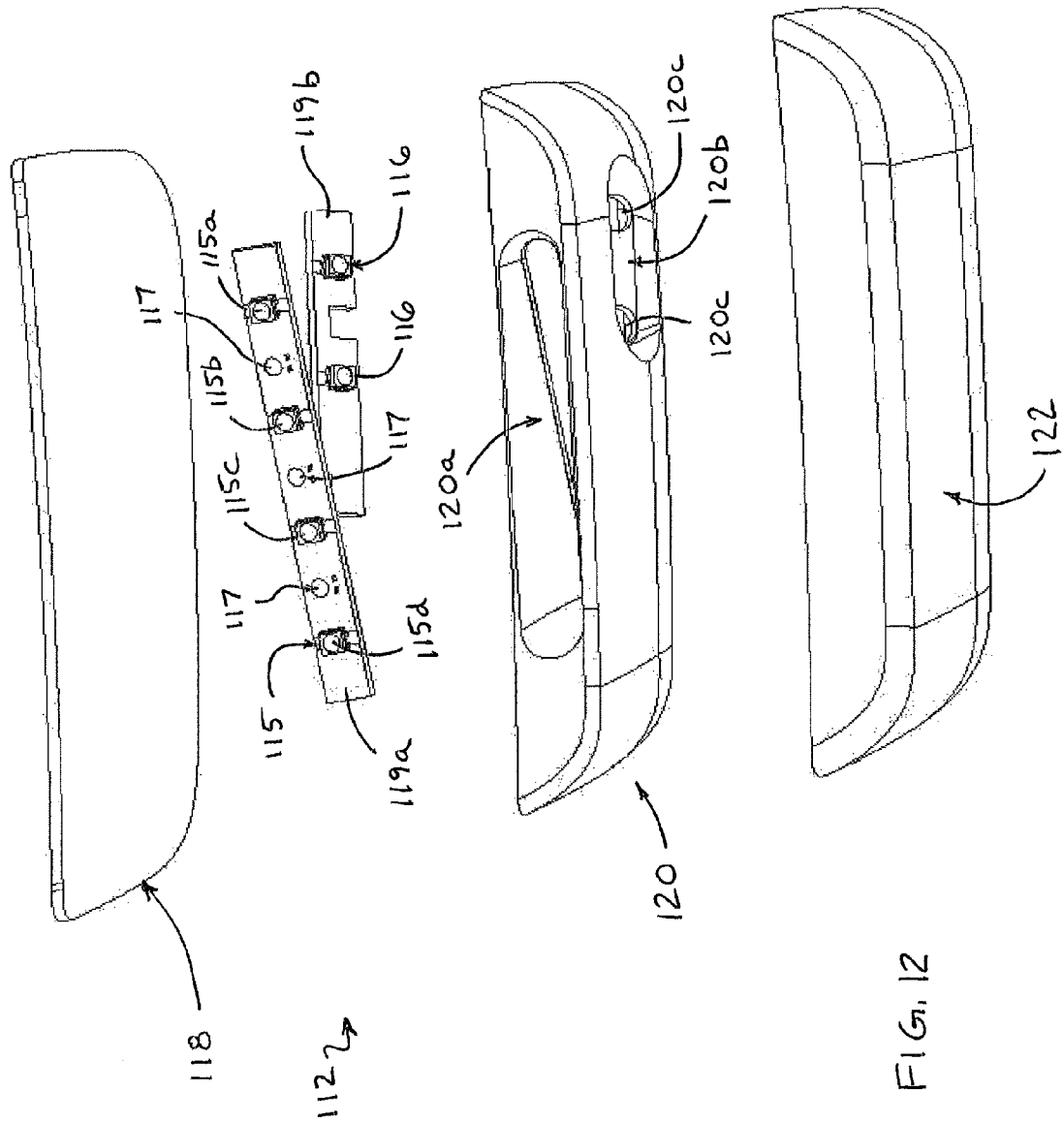
FIG. 12 is an exploded view of the light module of the mirror assembly of FIGS. 10 and 11.

Optionally, and with reference to FIGS. 10-12, a vehicle exterior rearview mirror assembly 110 is mountable at a door of a vehicle and includes a light module 112 disposed at a lower portion 114*a* of the mirror casing 114. As shown in FIG. 12, the light module 112 includes a plurality of illumination sources 115, 116, 117, such as light emitting diodes or the like, and the light module is configured to emit illumination in a generally rearwardly and/or downwardly direction when electrically powered. For example, illumination sources 115 may be powered to provide sideward rearward illumination (directed generally rearwardly and outwardly away from the side of the vehicle), such as for a turn signal indicator or the like, while illumination sources 116 may be powered to provide downward illumination, such as for a ground illuminating light or security light or puddle light at the side of the vehicle, as discussed below, and illumination sources 117 may be powered to provide rearward illumination, such as for a rear backup light or backup assist light or security light or the like. Thus, the present invention provides a multipurpose light module for an exterior rearview mirror assembly of a vehicle. The multipurpose light module provides a turn signal indicator and a ground illuminator in a single or common module or housing, and optionally may provide a reverse backup light or the like in that common module. Optionally, the multipurpose light module may include a forward facing light (such as one or more forward facing illumination sources such as described above). By using a common circuit board or base or support element and a common lens or cover or housing in a single or common light module, cost savings can be achieved by the multipurpose light module of the present invention.

In the illustrated embodiment, and as shown in FIG. 11, light module 112 comprises a self-contained unitary module that is attached (such as adhered or otherwise attached) at the outer surface of the mirror casing 114, such that the light module 112 may be provided as an aftermarket light module at the exterior rearview mirror assembly. Optionally, the light module 112 may connect to an electrical connector at the mirror assembly to connect to a power source and/or control of the mirror assembly and/or vehicle when the light module is attached at the mirror assembly. Optionally, the light module may include a battery or power source so that no electrical connections need be made at the mirror assembly, and the light module may be responsive to control signals (such as via wireless communication) of a control system of the mirror assembly or vehicle to provide the desired or appropriate or selected illumination at the side of the vehicle. Optionally, the light module may be disposed at or received in a recess or aperture of the mirror casing, such as in a similar manner as described above.

As shown in FIG. 12, light module 112 includes a support element 118, such as an attachment plate or backing plate of the module, and a light support and light guiding element 120 and an outer cover or housing 122. The illumination sources 115, 116, 117 may be disposed at or attached to or mounted on respective support elements 119a, 119b, such as respective circuit boards or the like, which are received in or disposed in or at the light support and light guiding element 120. In the illustrated embodiment, illumination sources 115 comprise four illumination sources or light emitting diodes that are disposed at support element 119a, which is mounted at and along an angled slotted region 120a of light support and light guiding element 120, so that the illumination sources 115 are directed generally rearwardly and outwardly away from the side of the vehicle when the mirror assembly equipped with the light module is normally mounted at the vehicle. Support element 119a may also support illumination sources 117, which provide a rear backup lighting function responsive to the driver of the vehicle shifting the gear selector of the vehicle to a reverse gear position or otherwise undertaking a reversing maneuver with the equipped vehicle.

In the illustrated embodiment, downward facing ground illuminating illumination sources 116 comprise two illumination sources or light emitting diodes that are disposed at support element 119b, which is mounted at and along an downwardly facing slotted region 120b of light support and light guiding element 120, so that the illumination sources 116 are directed generally downwardly at the side region adjacent to the vehicle when the mirror assembly equipped with the light module is normally mounted at the vehicle. The illumination sources 116 are generally aligned with a plurality of openings 120c that are configured to guide or direct or reflect illumination emitted by the illumination sources generally downwardly toward the ground area at or near the side of the vehicle and optionally to partially illuminate the side of the vehicle.

Thus, the multipurpose light module 112 may provide a turn signal indicator function that emits illumination rearwardly and outwardly from the exterior mirror assembly so that the emitted illumination is viewable by a driver of another vehicle approaching or overtaking the equipped vehicle at the side of the equipped vehicle, while being substantially not viewable or visible to the driver of the equipped vehicle while the driver is normally operating the equipped vehicle. Optionally, the turn signal indicator may be operable in a sequential flashing mode, whereby the illumination sources 115 are progressively powered and unpowered (such as by first powering the inboard illumination source 115a, then powering the next most inboard illumination source 115b while unpowering the inboard illumination source 115a, and then powering the outer center illumination source 115c while unpowering the inboard center illumination source 115b and then powering the outermost illumination source 115d while unpowering the outboard center illumination source 115c) so as to provide a flashing sequence that appears to have an illumination source moving outward toward the side area adjacent to the vehicle. The illumination sources 115 may be operable in response to the driver actuating the turn signal of the vehicle or the like.

Optionally, the illumination source or sources 117 for the rear backup lighting function may comprise white light-emitting illumination sources or light emitting diodes (and the cover panel may comprise a generally clear portion at the backup light illumination source or sources), while the illumination source or sources for the turn signal indicator function may comprise a colored illumination source or may comprise white light-emitting illumination sources or light emitting diodes with the cover panel having a colored light-transmitting portion at the turn signal indicator illumination source or sources. For example, the illumination sources 115 may comprise a plurality of amber colored light emitting diodes, such as, for example, four or five amber colored LEDs, and the illumination sources 117 may comprise a plurality of white light-emitting LEDs, such as, for example, three or four white LEDs, with the colored LEDs and white LEDs being alternatingly disposed (with a white LED disposed between adjacent amber LEDs) along the support element or circuit board 119a. When the driver of the vehicle places the gear shifter into a reverse gear position or undertakes a reversing maneuver, the white light-emitting LEDs 117 may be actuated or energized or powered to provide illumination rearwardly in the direction of reverse travel of the vehicle (and the light guiding element may be configured to direct the white light of the backup illumination sources generally rearwardly), and when the driver of the vehicle actuates a turn signal of the vehicle (such as when driving the vehicle forwardly along the road), the amber LEDs 115 may be actuated or energized or powered to provide illumination rearwardly and sidewardly of the vehicle (and the light guiding element may be configured to direct the amber light of the turn signal indicator illumination sources generally rearwardly and sidewardly away from the side of the equipped vehicle). Optionally, the light module and/or illumination sources may have a dimming control feature or function, such that the illumination sources, when activated, are ramped up or progressively powered up to their full illumination states, and when deactivated, are ramped down or dimmed or progressively powered down to their deactivated states.

In the illustrated embodiment, the support element or circuit board 119a is angled to direct light emitted by the turn signal indicator LEDs 115 outwardly away from the side of the equipped vehicle, and it is envisioned that the rear backup LEDs 117 may be mounted on the circuit board 119a at an angle so that illumination emitted by the rear backup LEDs 117 is directed generally rearwardly. Optionally, the cover and/or light support and light guiding element may be configured to direct light from the turn signal indicator LEDs 115 rearwardly and sidewardly/outwardly and light from the rear backup LEDs generally rearwardly, while remaining within the spirit and scope of the present invention.

Optionally, and desirably, the ground illuminating illumination sources 116 may comprise white light-emitting LEDs or the like, which may be actuated or energized or powered to provide illumination downwardly at the side area of the vehicle (and the light guiding element may be configured to direct the white light of the ground illumination sources generally downwardly at the side of the equipped vehicle). The illumination sources 116 may be operable in response to a passive entry system or the like of the vehicle so as to provide illumination at the side of the vehicle when the driver approaches the vehicle or touches or moves the door handle of the vehicle door or actuates a remote keyless entry module or passive entry device of the vehicle or inserts a key into a keyhole at the door or door handle or when a motion detector of the vehicle detects a motion at the vehicle, or the like. Optionally, and desirably, the illumination sources are deactuatable following a period of time after such an actuation of the illumination sources. Optionally, the light module and/or illumination sources may have a dimming control feature or function, such that the illumination sources, when powered or activated, are ramped up or progressively powered up to their full illumination states, and when unpowered or deactivated, are ramped down or dimmed or progressively powered down to their deactivated states.

Cover element or panel or housing 122 may comprise a translucent or visible light-transmitting cover panel or element (and/or may comprise a colored light-transmitting portion or element) that is disposed over the light support and light guiding element 120 and the attachment element 118 and support elements 119a, 119b and illumination sources 115, 116, 117. The housing 122 is configured to allow the illumination emitted by the illumination sources and reflected or directed or guided by the light guiding element 120 to pass through the housing 122 so as to illuminate the area rearward and/or downward of the mirror assembly and/or of the vehicle.

The housing or cover panel of the light module thus may be at least partially or substantially translucent or transparent at least at the regions corresponding to or aligned with the light directing portions 120a, 120b such that illumination emitted via the illumination sources 115, 116, 117 passes through the cover panel and toward the area rearward and sidewardly and/or downwardly of the mirror assembly at the side of the vehicle. Optionally, the housing or cover panel may provide a diffusing optic or diffusing effect or frosting to diffuse or spread out the emitted light to provide substantially uniform illumination and to limit or substantially preclude bright spots when the illumination sources are activated.

Optionally, the light support and light guiding element and/or the housing or cover panel may be overmolded over the illumination source or sources and circuitry and support to provide a substantially sealed and substantially water impervious light module. For example, the light support and light guiding element and/or the housing or cover panel may be overmolded over and around a metal stamping or stamped circuit element or plate with the illumination source or sources (such as LEDs or the like) fastened thereto or otherwise established thereon, or the light support and light guiding element and/or the housing may be overmolded over and around a printed circuit board or element with the illumination sources established thereon.

The light module may be located or established at or in the exterior surface or wall of the exterior mirror casing, such as at or on or in a metallic or plastic or polymeric portion of the mirror casing. The cover panel of the light module may have any desired or suitable exterior finish, such as a class A surface finish, and may be colored or finished to any desired or suitable finish, such as a black or dark or colored finish (or the material may be black or dark or colored polymeric or metallic material). Optionally, the cover panel may have a chrome finish or brushed aluminum finish or the like, such that illumination is provided through the chrome or brushed aluminum finished wall or structure of the mirror assembly.

In the illustrated embodiment, the attachment element 118 may be attached at the rear side or surface of the light guiding element 120, such as via a snap connection or fastenerless connection or the like. Likewise, the cover element 122 may be attached at the light guiding element 120 or at the attachment element 118, such as via a snap connection or fastenerless connection or the like. The light module 112 thus may comprise a unitary module that may be readily attached to the mirror assembly at the mirror casing 114, such as via adhesive or via a snap connection or fastenerless connection or the like. Optionally, electrical connection may be made between the circuit board (or circuitry or electrical connectors thereat or thereof) and one or more electrical connectors of the mirror assembly or vehicle that are disposed in or at the mirror casing. The light module 112 thus may be electrically connected to a power source and/or control of the vehicle or mirror assembly, whereby the illumination sources 115, 116, 117 may be powered or unpowered or controlled via a control circuit. Optionally, the electrical connection and mechanical connection of the self-contained light module may be made as the light module is snapped or otherwise mounted or attached to the mirror casing of the mirror assembly, such as by utilizing aspects of the accessory modules described in U.S. Pat. Nos. 6,669,267; 6,969,101; 6,824,281; and/or 7,188,963, which are hereby incorporated herein by reference in their entireties.

Figure 13:
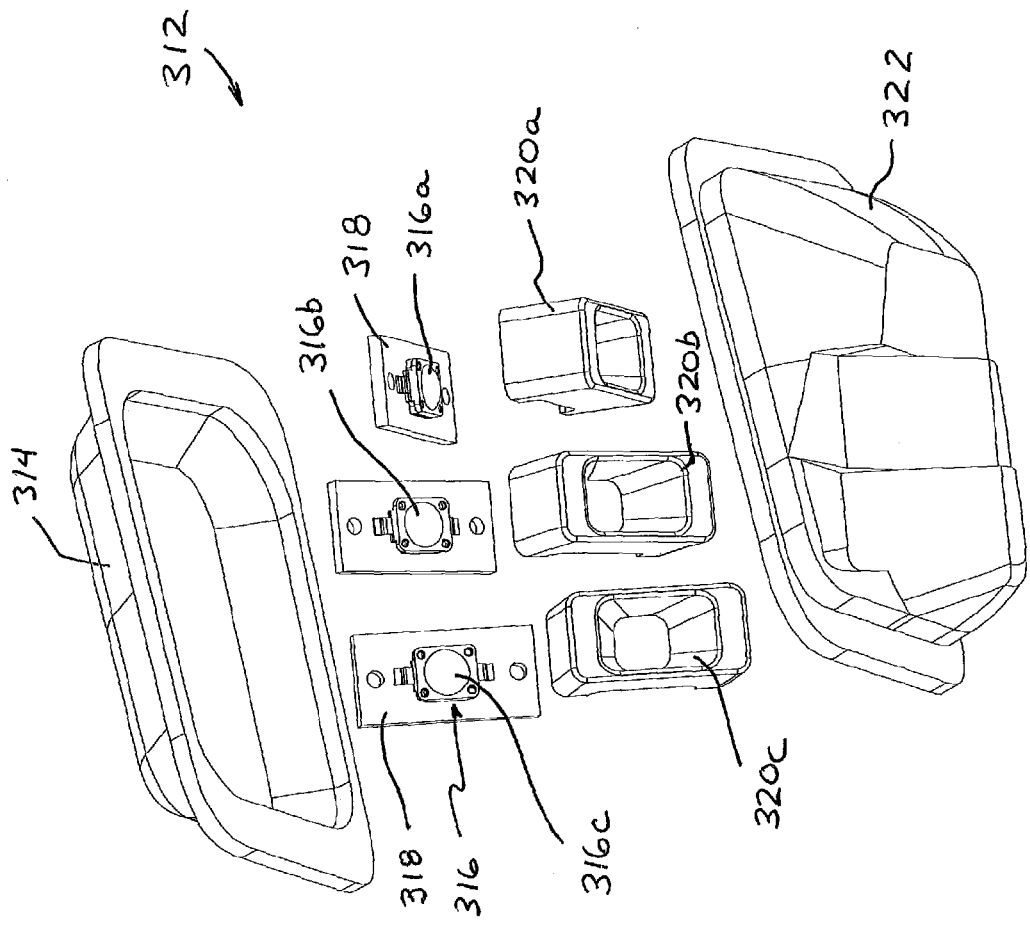
FIG. 13 is an exploded view of a ground illumination module suitable for use in or with a light module of the present invention.

Optionally, a ground illumination light module 312 (FIG. 13) may be provided at the lower portion of an exterior rearview mirror to provide illumination generally downward at the side of the vehicle. The ground illumination light module 312 includes a housing or support element or portion 314 that supports or receives individual illumination sources 316 disposed at circuit elements 318, with the illumination sources 316 being generally aligned with respective openings of a light guiding or directing element or elements 320a-c, so as to emit light through the openings and through a cover element or lens 322. In the illustrated embodiment, the illumination sources 316 and the light directing elements 320 function to direct light from each illumination source in a different direction, with an inboard illumination source 316a emitting light generally downwardly (so as to illuminate the ground area at the side of the vehicle and below and forwardly and rearwardly of the mirror assembly), a central illumination source 316b emitting light generally downwardly and rearwardly (so as to illuminate the ground area at the side of the vehicle and below and more rearwardly of the mirror assembly), and an outboard illumination source 316c emitting light generally downwardly and rearwardly (so as to illuminate the ground area at the side of the vehicle and below and further rearwardly of the mirror assembly), such that, when all three illumination sources are actuated, the side region of the vehicle is illuminated along the front and rear doors of the vehicle to provide enhanced side and ground illumination at the side of the vehicle. The ground illumination light module 312 may be incorporated in a multi-function light module as described above or may be a separate stand-alone module, and/or optionally, the illumination sources may be selectively energized in response to a user input to provide a desired illumination pattern at the side of the vehicle (such as in a similar manner as discussed above) and/or may be selectively energized to a selected or customized color (such as in a similar manner as discussed above), while remaining within the spirit and scope of the present invention.

Figure 14:
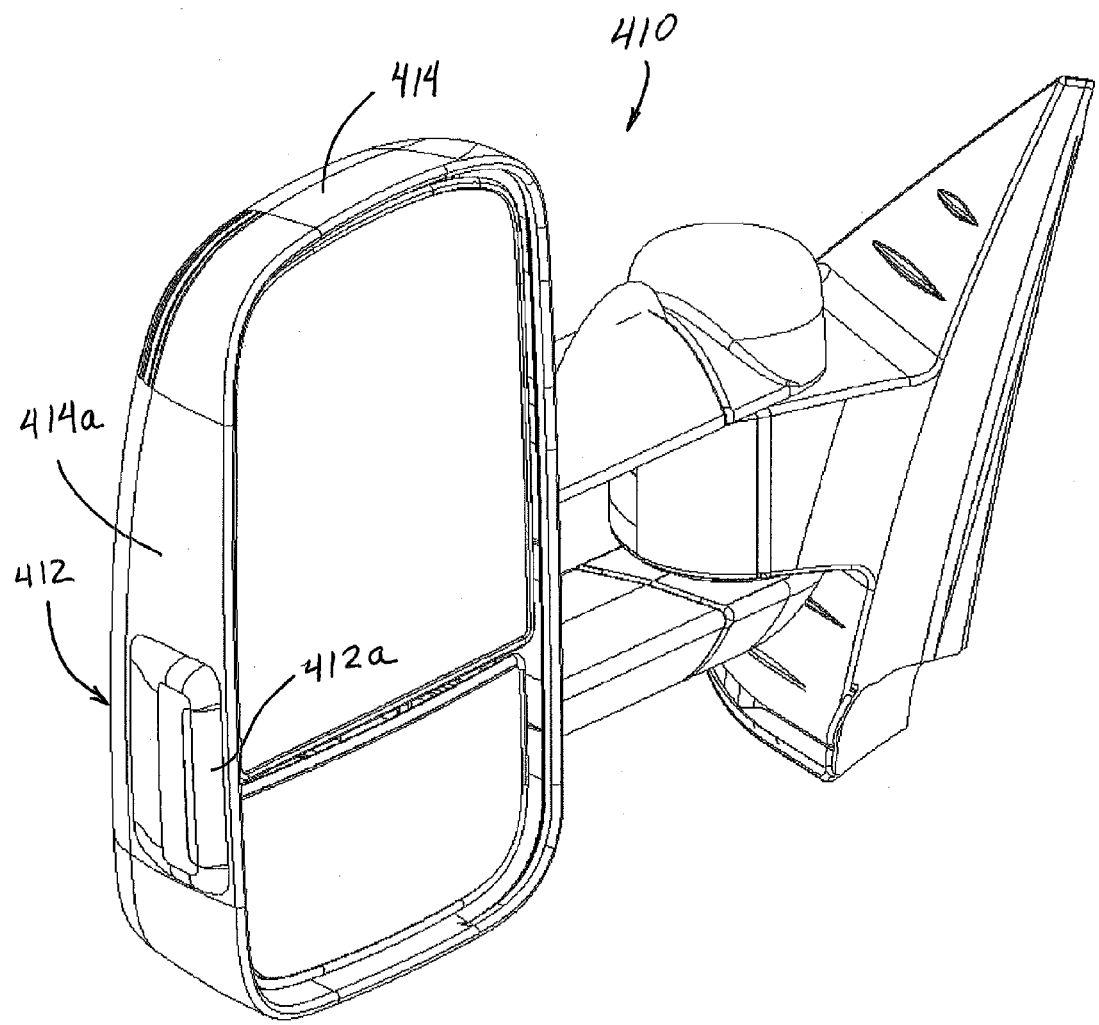
FIG. 14 is a perspective view of another vehicle exterior rearview mirror assembly in accordance with the present invention.

Optionally, and with reference to FIG. 14, a vehicle exterior rearview mirror assembly 410 is mountable at a door of a vehicle and includes a light module 412 disposed at an outboard side region or portion 414a of the mirror casing 414. The light module 412 includes a plurality of illumination sources, such as light emitting diodes or the like, and the light module is configured to emit illumination in a generally rearwardly and/or downwardly direction when electrically powered. For example, the illumination sources may be powered to provide rearward illumination (directed generally rearwardly of the vehicle), such as for a rear backup light or backup assist light or security light or the like. The module may include a rearward facing generally transparent or translucent lens or cover portion 412a, whereby light (such as white light) emitted by the illumination sources or light emitting diodes emanates through the cover portion in a generally rearward direction so as to illuminate the area to the side and rear of the vehicle, in order to assist the driver in making a reversing maneuver. Optionally, the light module 412 may provide a multipurpose light module for an exterior rearview mirror assembly of a vehicle, and may also include a ground illumination light and/or a turn signal indicator or the like, such as discussed above. Optionally, the light module may also or otherwise include a forward facing light (such as one or more forward facing illumination sources such as described above). By using a common circuit board or base or support element and a common lens or cover or housing in a single or common light module, cost savings can be achieved by the multipurpose light module of the present invention.

In the illustrated embodiment, and as shown in FIG. 14, light module 412 comprises a self-contained unitary module that is attached (such as adhered or otherwise attached) at the outer surface of the mirror casing 414, such that the light module 412 may be provided as an aftermarket light module at the exterior rearview mirror assembly. Optionally, the light module 412 may connect to an electrical connector at the mirror assembly to connect to a power source and/or control of the mirror assembly and/or vehicle when the light module is attached at the mirror assembly. Optionally, the light module may include a battery or power source so that no electrical connections need be made at the mirror assembly, and the light module may be responsive to control signals (such as via wireless communication) of a control system of the mirror assembly or vehicle to provide the desired or appropriate or selected illumination at the side of the vehicle. Optionally, the light module may be disposed at or received in a recess or aperture of the mirror casing, such as in a similar manner as described above.

The light module 412 may include a plurality of illumination sources, such as four (or more or less) illumination sources or light emitting diodes that are disposed in an array or column along the outboard portion or region of the mirror casing. The illumination sources may provide a rear backup lighting function responsive to the driver of the vehicle shifting the gear selector of the vehicle to a reverse gear position or otherwise undertaking a reversing maneuver with the equipped vehicle. Optionally, and desirably, each of the driver side and passenger side exterior rearview mirror assemblies includes a light module and the rearward facing illumination sources are actuated in response to the driver of the vehicle shifting the gear selector to a reverse gear position, such that the light modules illuminate both sides of the vehicle and rearward of the vehicle during the reversing maneuver.

Thus, the light module may be configured as a sealed, self-contained illumination module with a lens or optical element, such as a simple lens, a potted design engineered lens or aperture, which may be configured to block or limit light glare at the mirror casing surface. The optic elements may comprise any suitable material, such as a clear polycarbonate, a polystyrene, an acrylic or the like, for environmental robustness. The physical size and shape and position of the apertures for the light output may be selected to provide the desired light output, such as a desired intensity, diffuseness and/or direction of illumination emanating from the light module when the illumination sources are activated. A texture or frosting of the lens or lenses or optical elements may also be provided to spread or diffuse the light output of the light module. The light module may also include a capacitor or capacitors to limit damage from electro-static discharge. The limit module also includes resistors, which are selected to ensure the same or substantially the same net light output of the illumination sources of the light module. The housing or cover may be overmolded over the illumination source and circuitry of the light module to substantially seal the circuitry within the module and mirror casing.

Optionally, the illumination module and/or the exterior rearview mirror assembly may incorporate a blind spot indicator device or element and/or a turn signal indicator device or element, such as by utilizing aspects of the devices described in U.S. provisional applications, and/or U.S. Pat. Nos. 7,626,749; 7,492,281; 7,255,451; 6,198,409; 5,929,786; and 5,786,772, and/or U.S. patent application Ser. No. 12/446,507, filed Apr. 21, 2009; and/or Ser. No. 12/187,725, filed Aug. 7, 2008; and/or Ser. No. 12/264,669, filed Nov. 4, 2008, now U.S. Pat. No. 7,944,371, which are hereby incorporated herein by reference in their entireties. The signal indicator or indication module may include or utilize aspects of various light modules or systems or devices, such as the types described in U.S. Pat. Nos. 7,581,859; 7,289,037; 6,227,689; 6,582,109; 5,371,659; 5,497,306; 5,669,699; 5,823,654; 6,176,602; and/or 6,276,821, and/or U.S. patent application Ser. No. 11/226,628, filed Sep. 14, 2005 and published Mar. 23, 2006 as U.S. Publication No. US-2006-0061008, and/or PCT Application No. PCT/US2006/018567, filed May 16, 2006 and published Nov. 23, 2006 as International Publication No. WO 2006/124682, which are hereby incorporated herein by reference in their entireties. Optionally, the exterior rearview mirror assembly may include a wide angle reflector at or integral with the reflective element, such as by utilizing aspects of the elements described in U.S. Pat. Nos. 7,748,856; 7,255,451; 7,195,381; 6,717,712; 7,126, 456; 6,315,419; 7,097,312; and/or 6,522,451, which are hereby incorporated herein by reference in their entireties.

Optionally, the illumination module may also comprise a ground illumination light or puddle lamp, which provides downwardly directed illumination (and which may provide a back lit icon or indicia or logo or the like), such as by utilizing aspects of the illumination systems described in U.S. Pat. Nos. 5,371,659, 5,669,699, 5,823,654 and 5,497,305, and/or U.S. patent application Ser. No. 12/596,891, filed Oct. 21, 2009, which are hereby incorporated herein by reference in their entireties. Optionally, the illumination module may comprise a cornering light and a puddle lamp and turn signal light, and may have a wrap-around style turn signal at the exterior mirror that may be fitted with a prism lens or the like to project light in the appropriate direction and/or toward the targeted location. The illumination module thus may include one or more illumination sources and one or more lenses or optics or light pipes or the like to distribute or direct illumination toward the appropriate targeted areas.

Changes and modifications to the specifically described embodiments may be carried out without departing from the principles of the present invention, which is intended to be limited only by the scope of the appended claims as interpreted according to the principles of patent law.

The invention claimed is:

1. A lighted exterior rearview mirror system suitable for use on a vehicle, said lighted exterior rearview mirror system comprising:

a lighted exterior rearview mirror assembly;

said lighted exterior rearview mirror assembly comprising at least one of (i) a breakaway exterior rearview mirror assembly and (ii) a powerfold exterior rearview mirror assembly;

said lighted exterior rearview mirror assembly comprising a movable portion and a fixed portion, wherein said fixed portion attaches at a side of a vehicle equipped with said lighted exterior rearview mirror system, and wherein said movable portion is movably attached at said fixed portion and is movable relative to said fixed portion;

wherein, when said lighted exterior rearview mirror assembly is attached at the side of the equipped vehicle, said movable portion is movable from an extended position, where said movable portion generally extends away from the side of the equipped vehicle, to a folded position, where said movable portion is generally folded towards the side of the equipped vehicle;

said movable portion comprising a mirror casing that houses a mirror reflective element;

said mirror casing having a portion that faces at least one of (i) generally forward of the equipped vehicle when said fixed portion attaches at the side of the equipped vehicle and when said movable portion is in said extended position and (ii) generally sideward of the equipped vehicle when said fixed portion attaches at the side of the equipped vehicle and when said movable portion is in said extended position;

a multifunction light module disposed at said movable portion of said lighted exterior rearview mirror assembly, said multifunction light module comprising a plurality of illumination sources operable to emit light;

wherein an exterior surface of said mirror casing has a contour and wherein an exterior surface of said multifunction light module has a contour, and wherein the contour of the exterior surface of said multifunction light module at least partially corresponds to the contour of the exterior surface of said mirror casing;

wherein said plurality of illumination sources comprises a set of white light-emitting illumination sources for a spotlight function of said multifunction light module;

wherein said multifunction light module is configured to emit white light illumination at least in a generally forward direction when white light-emitting illumination sources of said set of white light-emitting illumination sources are electrically powered when said lighted exterior rearview mirror assembly is attached at the side of the equipped vehicle and when said movable portion is at said extended position;

said set of white light-emitting illumination sources emitting white visual light when electrically energized;

wherein said plurality of illumination sources comprises at least one non-white light-emitting illumination source for a turn signal indicator function of said multifunction light module;

wherein said at least one non-white light-emitting illumination source is operable in response to actuation of a turn signal actuator by a driver of the equipped vehicle;

said at least one non-white light-emitting illumination source emitting non-white visual light when electrically energized;

wherein illumination sources of said set of white light-emitting illumination sources are controlled responsive to actuation by the driver of the equipped vehicle of a user input located in the interior cabin of the equipped vehicle to provide a white light visual spotlight emanating from said exterior rearview mirror assembly;

wherein said white light visual spotlight, when electrically energized responsive to actuation by the driver of the equipped vehicle of said user input, illuminates at least generally forward of the equipped vehicle with white light that is visible to the driver;

wherein said multifunction light module is operable to provide said turn signal indicator function independent of operation of said spotlight function; and wherein actuation of said illumination sources of said set of white light-emitting illumination sources by the driver actuating said user input is independent of actuation of said at least one non-white light-emitting illumination source by the driver actuating said turn signal actuator.

2. The lighted exterior rearview mirror system of claim 1, wherein illumination sources of said set of white light-emitting illumination sources are also controlled responsive to an object detection system of the vehicle so as to direct said spotlight towards a detected object at or near the equipped vehicle.

3. The lighted exterior rearview mirror system of claim 1, wherein said multifunction light module comprises a light-transmitting cover and wherein said plurality of illumination sources are disposed behind said light-transmitting cover and operable to emit light that passes through said light-transmitting cover.

4. The lighted exterior rearview mirror system of claim 1, wherein said white light-emitting light emitting diodes are generally linearly arranged on a circuit board.

5. The lighted exterior rearview mirror system of claim 1, wherein said set of white light-emitting illumination sources comprises at least four white light-emitting light emitting diodes.

6. The lighted exterior rearview mirror system of claim 5, wherein said at least one non-white light-emitting illumination source comprises at least one non-white light-emitting light emitting diode.

7. The lighted exterior rearview mirror system of claim 5, wherein a control circuit is responsive to said user input to energize at least some of said at least four white light-emitting light emitting diodes.

8. The lighted exterior rearview mirror system of claim 7, wherein said control circuit adjusts a duty cycle of said at least some of said at least four white light-emitting light emitting diodes responsive to said user input.

9. The lighted exterior rearview mirror system of claim 8, wherein said control circuit is operable to power all of said at least four white light-emitting light emitting diodes responsive to said user input.

10. The lighted exterior rearview mirror system of claim 7, wherein said lighted exterior rearview mirror assembly comprises a powerfold exterior rearview mirror assembly and wherein, when said powerfold exterior rearview mirror assembly is in its folded position, said multifunction light module is operable to provide illumination along the side of the vehicle.

11. The lighted exterior rearview mirror system of claim 7, wherein said user input comprises a laterally adjustable input.

12. The lighted exterior rearview mirror system of claim 11, wherein said lighted exterior rearview mirror assembly comprises a driver side lighted exterior rearview mirror assembly, and wherein, responsive to adjustment of said user input towards a passenger side of the vehicle, said control circuit increases the intensity of light emitted by at least one inboard illumination source of said set of white light-emitting illumination sources of said multifunction light module, and wherein, responsive to adjustment of said user input towards a driver side of the vehicle, said control circuit increases the intensity of light emitted by at least one outboard illumination source of said set of white light-emitting illumination sources of said multifunction light module.

13. The lighted exterior rearview mirror system of claim 1, wherein said at least one non-white light-emitting illumination source comprises at least two non-white light-emitting illumination sources.

14. The lighted exterior rearview mirror system of claim 1, wherein said mirror casing has a portion that faces (i) generally forward of the equipped vehicle when said fixed portion attaches at the side of the equipped vehicle and when said movable portion is in said extended position and (ii) generally sideward of the equipped vehicle when said fixed portion attaches at the side of the equipped vehicle and when said movable portion is in said extended position, and wherein said multifunction light module is disposed at least partially at said generally sideward portion of said mirror casing and is configured to emit white light generally sideward of the equipped vehicle.

15. The lighted exterior rearview mirror system of claim 14, wherein an outboard one of said illumination sources of said set of white light-emitting illumination sources is directed partially sideways away from the side of the vehicle when said lighted exterior rearview mirror assembly is normally mounted at the vehicle, and wherein illumination from said outboard illumination source is directed at least partially rearward.

16. The lighted exterior rearview mirror system of claim 15, wherein said multifunction light module comprises a light-transmitting cover and wherein said plurality of illumination sources are disposed behind said light-transmitting cover and operable to emit light that passes through said light-transmitting cover, and wherein said light-transmitting cover is curved to follow the contour of said exterior surface of said mirror casing of said lighted exterior rearview mirror assembly.

17. A lighted exterior rearview mirror system suitable for use on a vehicle, said lighted exterior rearview mirror system comprising:

a lighted exterior rearview mirror assembly;

said lighted exterior rearview mirror assembly comprising at least one of (i) a breakaway exterior rearview mirror assembly and (ii) a powerfold exterior rearview mirror assembly;

said lighted exterior rearview mirror assembly comprising a movable portion and a fixed portion, wherein said fixed portion attaches at a side of a vehicle equipped with said lighted exterior rearview mirror system, and wherein said movable portion is movably attached at said fixed portion and is movable relative to said fixed portion;

wherein, when said lighted exterior rearview mirror assembly is attached at the side of the equipped vehicle, said movable portion is movable from an extended position, where said movable portion generally extends away from the side of the equipped vehicle, to a folded position, where said movable portion is generally folded towards the side of the equipped vehicle;

said movable portion comprising a mirror casing that houses a mirror reflective element;

said mirror casing having a portion that faces at least one of (i) generally forward of the equipped vehicle when said fixed portion attaches at the side of the equipped vehicle and when said movable portion is in said extended position and (ii) generally sideward of the equipped vehicle when said fixed portion attaches at the side of the equipped vehicle and when said movable portion is in said extended position;

a multifunction light module disposed at said movable portion of said lighted exterior rearview mirror assembly, said multifunction light module comprising a plurality of illumination sources operable to emit light;

wherein an exterior surface of said mirror casing has a contour and wherein an exterior surface of said multifunction light module has a contour, and wherein the contour of the exterior surface of said multifunction light module at least partially corresponds to the contour of the exterior surface of said mirror casing;

wherein said plurality of illumination sources comprises a set of white light-emitting illumination sources for a spotlight function of said multifunction light module;

wherein said multifunction light module is configured to emit white light illumination at least in a generally forward direction when white light-emitting illumination sources of said set of white light-emitting illumination sources are electrically powered when said lighted exterior rearview mirror assembly is attached at the side of the equipped vehicle and when said movable portion is at said extended position;

said set of white light-emitting illumination sources emitting white visual light when electrically energized;

wherein said plurality of illumination sources comprises at least one non-white light-emitting illumination source for a turn signal indicator function of said multifunction light module;

said at least one non-white light-emitting illumination source emitting non-white visual light when electrically energized;

wherein said white light-emitting light emitting diodes are generally linearly arranged on a circuit board;

a control circuit responsive to a user input to energize said illumination sources, and wherein illumination sources of said set of white light-emitting illumination sources are controlled responsive to said user input to provide a white light visual spotlight emanating from said exterior rearview mirror assembly;

wherein said white light visual spotlight, when electrically energized responsive to actuation by the driver of the equipped vehicle of said user input, illuminates at least generally forward of the equipped vehicle with white light that is visible to the driver;

wherein said at least one non-white light-emitting illumination source is controlled in response to actuation of a turn signal actuator by a driver of the equipped vehicle;

wherein said multifunction light module is operable to provide said turn signal indicator function independent of operation of said spotlight function; and wherein actuation of said illumination sources of said set of white light-emitting illumination sources by the driver actuating said user input is independent of actuation of said at least one non-white light-emitting illumination source by the driver actuating said turn signal actuator.

18. The lighted exterior rearview mirror system of claim 17, wherein illumination sources of said set of white light-emitting illumination sources are also controlled responsive to an object detection system of the vehicle so as to direct said spotlight towards a detected object at or near the equipped vehicle.

19. The lighted exterior rearview mirror system of claim 17, wherein said set of white light-emitting illumination sources comprises at least four white light-emitting light emitting diodes.

20. The lighted exterior rearview mirror system of claim 17, wherein said control circuit adjusts a duty cycle of said light emitting diodes responsive to said user input.

21. The lighted exterior rearview mirror system of claim 17, wherein said lighted exterior rearview mirror assembly comprises a powerfold exterior rearview mirror assembly and wherein, when said powerfold exterior rearview mirror assembly is in its folded position, said multifunction light module is operable to provide illumination along the side of the vehicle.

22. A lighted exterior rearview mirror system suitable for use on a vehicle, said lighted exterior rearview mirror system comprising:

a lighted exterior rearview mirror assembly;

said lighted exterior rearview mirror assembly comprising at least one of (i) a breakaway exterior rearview mirror assembly and (ii) a powerfold exterior rearview mirror assembly;

said lighted exterior rearview mirror assembly comprising a movable portion and a fixed portion, wherein said fixed portion attaches at a side of a vehicle equipped with said lighted exterior rearview mirror system, and wherein said movable portion is movably attached at said fixed portion and is movable relative to said fixed portion;

wherein, when said lighted exterior rearview mirror assembly is attached at the side of the equipped vehicle, said movable portion is movable from an extended position, where said movable portion generally extends away from the side of the equipped vehicle, to a folded position, where said movable portion is generally folded towards the side of the equipped vehicle;

said movable portion comprising a mirror casing that houses a mirror reflective element;

said mirror casing having a portion that faces at least one of (i) generally forward of the equipped vehicle when said fixed portion attaches at the side of the equipped vehicle and when said movable portion is in said extended position and (ii) generally sideward of the equipped vehicle when said fixed portion attaches at the side of the equipped vehicle and when said movable portion is in said extended position;

a multifunction light module disposed at said movable portion of said lighted exterior rearview mirror assembly, said multifunction light module comprising a plurality of illumination sources operable to emit light;

wherein an exterior surface of said mirror casing has a contour and wherein an exterior surface of said multifunction light module has a contour, and wherein the contour of the exterior surface of said multifunction light module at least partially corresponds to the contour of the exterior surface of said mirror casing;

wherein said plurality of illumination sources comprises a set of white light-emitting illumination sources, and wherein said set of white light-emitting illumination sources comprises at least four white light-emitting light emitting diodes;

wherein said multifunction light module is configured to emit white light illumination at least in a generally forward direction when white light-emitting illumination sources of said set of white light-emitting illumination sources are electrically powered when said lighted exterior rearview mirror assembly is attached at the side of the equipped vehicle and when said movable portion is at said extended position;

said at least four white light-emitting light emitting diodes emitting white visual light when electrically energized;

wherein said plurality of illumination sources comprises at least one non-white light-emitting light emitting diode for a turn signal indicator function of said multifunction light module;

said at least one non-white light-emitting light emitting diode emitting non-white visual light when electrically energized;

wherein said multifunction light module comprises a light-transmitting cover and wherein said plurality of illumination sources are disposed behind said light-transmitting cover and operable to emit light that passes through said light-transmitting cover;

wherein said light-transmitting cover is curved to follow the contour of said exterior surface of said mirror casing of said lighted exterior rearview mirror assembly;

wherein said at least one non-white light-emitting light emitting diode is operable in response to actuation of a turn signal actuator by a driver of the equipped vehicle;

a control circuit responsive to a user input located in the interior cabin of the equipped vehicle to energize said illumination sources, and wherein illumination sources of said set of white light-emitting illumination sources are controlled responsive to actuation by the driver of the equipped vehicle of said user input to provide a white light visual spotlight emanating from said exterior rearview mirror assembly;

wherein said white light visual spotlight, when electrically energized responsive to actuation by the driver of the equipped vehicle of said user input, illuminates at least generally forward of the equipped vehicle with white light that is visible to the driver;

wherein said multifunction light module is operable to provide said turn signal indicator function independent of operation of said spotlight function; and wherein actuation of said illumination sources of said set of white light-emitting illumination sources by the driver actuating said user input is independent of actuation of said at least one non-white light-emitting illumination source by the driver actuating said turn signal actuator.

23. The lighted exterior rearview mirror system of claim 22, wherein said control circuit adjusts a duty cycle of said light emitting diodes responsive to said user input.

24. The lighted exterior rearview mirror system of claim 22, wherein illumination sources of said white light-emitting illumination sources are also controlled responsive to an object detection system of the vehicle so as to direct said spot light towards a detected object at or near the equipped vehicle.

25. The lighted exterior rearview mirror system of claim 22, wherein said user input comprises one of a dial, a knob and a switch.

26. The lighted exterior rearview mirror system of claim 22, wherein said user input comprises at least one of a switch and a button.

27. A lighted exterior rearview mirror system suitable for use on a vehicle, said lighted exterior rearview mirror system comprising:
 a lighted exterior rearview mirror assembly;
 said lighted exterior rearview mirror assembly comprising at least one of (i) a breakaway exterior rearview mirror assembly and (ii) a powerfold exterior rearview mirror assembly;
 said lighted exterior rearview mirror assembly comprising a movable portion and a fixed portion, wherein said fixed portion attaches at a side of a vehicle equipped with said lighted exterior rearview mirror system, and wherein said movable portion is movably attached at said fixed portion and is movable relative to said fixed portion;
 wherein, when said lighted exterior rearview mirror assembly is attached at the side of the equipped vehicle, said movable portion is movable from an extended position, where said movable portion generally extends away from the side of the equipped vehicle, to a folded position, where said movable portion is generally folded towards the side of the equipped vehicle;
 said movable portion comprising a mirror casing that houses a mirror reflective element;
 said mirror casing having a portion that faces at least one of (i) generally forward of the equipped vehicle when said fixed portion attaches at the side of the equipped vehicle and when said movable portion is in said extended position and (ii) generally sideward of the equipped vehicle when said fixed portion attaches at the side of the equipped vehicle and when said movable portion is in said extended position;
 a multifunction light module disposed at said movable portion of said lighted exterior rearview mirror assembly, said multifunction light module comprising a plurality of light emitting diodes operable to emit light;
 wherein an exterior surface of said mirror casing has a contour and wherein an exterior surface of said multifunction light module has a contour, and wherein the contour of the exterior surface of said multifunction light module at least partially corresponds to the contour of the exterior surface of said mirror casing;
 wherein said plurality of light emitting diodes comprises a set of white light-emitting light emitting diodes for a spotlight function of said multifunction light module;
 wherein said multifunction light module is configured to emit white light illumination at least in a generally forward direction when white light-emitting illumination sources of said set of white light-emitting illumination sources are electrically powered when said lighted exterior rearview mirror assembly is attached at the side of the equipped vehicle and when said movable portion is at said extended position;
 said set of white light-emitting light emitting diodes emitting white visual light when electrically energized;
 wherein said plurality of light emitting diodes comprises at least one non-white light-emitting light emitting diode for a turn signal indicator function of said multifunction light module;
 said at least one non-white light-emitting light emitting diode emitting non-white visual light when electrically energized;
 wherein, responsive to a user input located in the interior cabin of the equipped vehicle, light emitting diodes of said set of white light-emitting light emitting diodes are controlled by a control circuit responsive to actuation by the driver of the equipped vehicle of said user input to provide a white light visual spotlight emanating from said exterior rearview mirror assembly;
 wherein said white light visual spotlight, when electrically energized responsive to actuation by the driver of the equipped vehicle of said user input, illuminates at least generally forward of the equipped vehicle with white light that is visible to the driver;
 wherein said multifunction light module is operable to provide said turn signal indicator function in response to actuation of a turn signal actuator by a driver of the equipped vehicle;
 wherein said multifunction light module is operable to provide said turn signal indicator function independent of operation of said spotlight function; and
 wherein actuation of said light emitting diodes of sad set of white light-emitting light emitting diodes by the driver actuating said user input is independent of actuation of said at least one non-white light-emitting light emitting diode by the driver actuating said turn signal actuator.

28. The lighted exterior rearview mirror system of claim 27, wherein said multifunction light module comprises a light-transmitting cover and wherein said plurality of light emitting diodes are disposed behind said light-transmitting cover and operable to emit light that passes through said light-transmitting cover.

29. The lighted exterior rearview mirror system of claim 28, wherein said light-transmitting cover comprises at least one of polycarbonate, polystyrene and acrylic.

30. The lighted exterior rearview mirror system of claim 27, wherein said white light-emitting light emitting diodes are generally linearly arranged on a circuit board.

31. The lighted exterior rearview mirror system of claim 27, wherein said set of white light-emitting light emitting diodes comprises at least four white light-emitting light emitting diodes.

32. The lighted exterior rearview mirror system of claim 31, wherein said at least one non-white light-emitting light emitting diode comprises an amber light-emitting light emitting diode.

33. The lighted exterior rearview mirror system of claim 27, wherein said at least one non-white light-emitting light emitting diode comprises at least two non-white light-emitting light emitting diodes.

34. The lighted exterior rearview mirror system of claim 27, wherein said at least one non-white light-emitting light emitting diode comprises at least two amber light-emitting light emitting diodes.

35. The lighted exterior rearview mirror system of claim 27, wherein said lighted exterior rearview mirror assembly comprises a ground illumination source operable to illuminate a ground area adjacent the side of the equipped vehicle when said lighted exterior rearview mirror assembly is attached thereat.

36. The lighted exterior rearview mirror system of claim 35, wherein said ground illumination source is operable responsive to at least one of (i) a passive entry system of the equipped vehicle, (ii) approach of a driver to the equipped vehicle, (iii) opening a door of the equipped vehicle and (iv) actuation of a key fob.

37. The lighted exterior rearview mirror system of claim 36, wherein, when operated, said ground illumination source illuminates a portion of the side of the equipped vehicle.

38. The lighted exterior rearview mirror system of claim 37, wherein said ground illumination source comprises a part of said multifunction light module.

39. The lighted exterior rearview mirror system of claim 27, wherein said multifunction light module comprises a light guide.

40. The lighted exterior rearview mirror system of claim 27, wherein said user input comprises one of a dial, a knob and a switch.

41. The lighted exterior rearview mirror system of claim 27, wherein said user input comprises at least one of a switch and a button.

42. A lighted exterior rearview mirror system suitable for use on a vehicle, said lighted exterior rearview mirror system comprising:

a lighted exterior rearview mirror assembly;

said lighted exterior rearview mirror assembly comprising at least one of (i) a breakaway exterior rearview mirror assembly and (ii) a powerfold exterior rearview mirror assembly;

said lighted exterior rearview mirror assembly comprising a movable portion and a fixed portion, wherein said fixed portion attaches at a side of a vehicle equipped with said lighted exterior rearview mirror system, and wherein said movable portion is movably attached at said fixed portion and is movable relative to said fixed portion;

wherein, when said lighted exterior rearview mirror assembly is attached at the side of the equipped vehicle, said movable portion is movable from an extended position, where said movable portion generally extends away from the side of the equipped vehicle, to a folded position, where said movable portion is generally folded towards the side of the equipped vehicle;

said movable portion comprising a mirror casing that houses a mirror reflective element;

said mirror casing having a portion that faces at least one of (i) generally forward of the equipped vehicle when said fixed portion attaches at the side of the equipped vehicle and when said movable portion is in said extended position and (ii) generally sideward of the equipped vehicle when said fixed portion attaches at the side of the equipped vehicle and when said movable portion is in said extended position;

a multifunction light module disposed at said movable portion of said lighted exterior rearview mirror assembly, said multifunction light module comprising a plurality of light emitting diodes operable to emit light;

wherein an exterior surface of said mirror casing has a contour and wherein an exterior surface of said multifunction light module has a contour, and wherein the contour of the exterior surface of said multifunction light module at least partially corresponds to the contour of the exterior surface of said mirror casing;

wherein said plurality of light emitting diodes comprises a set of white light-emitting light emitting diodes for a spotlight function of said multifunction light module;

wherein said multifunction light module is configured to emit white light illumination at least in a generally forward direction when white light-emitting illumination sources of said set of white light-emitting illumination sources are electrically powered when said lighted exterior rearview mirror assembly is attached at the side of the equipped vehicle and when said movable portion is at said extended position;

wherein said set of white light-emitting light emitting diodes comprises at least four white light-emitting light emitting diodes;

said at least four white light-emitting light emitting diodes emitting white visual light when electrically energized;

wherein said plurality of light emitting diodes comprises at least two amber light-emitting light emitting diodes for a turn signal indicator function of said multifunction light module;

said at least two amber light-emitting light emitting diodes emitting amber visual light when electrically energized;

wherein, responsive to a user input located in an interior cabin of the equipped vehicle, light emitting diodes of said set of white light-emitting light emitting diodes are controlled by a control circuit, responsive to actuation by a driver of the equipped vehicle of said user input, to provide a white light visual spotlight emanating from said exterior rearview mirror assembly;

wherein said white light visual spotlight, when electrically energized responsive to actuation by the driver of the equipped vehicle of said user input, illuminates at least generally forward of the equipped vehicle with white light that is visible to the driver;

wherein said lighted exterior rearview mirror assembly comprises a ground illumination source operable to illuminate a ground area adjacent the side of the equipped vehicle when said lighted exterior rearview mirror assembly is attached thereat;

wherein said multifunction light module is operable to provide said turn signal indicator function in response to actuation of a turn signal actuator by the driver of the equipped vehicle;

wherein said multifunction light module is operable to provide said turn signal indicator function independent of operation of said spotlight function; and wherein actuation of said light emitting diodes of said set of white light-emitting light emitting diodes by the driver actuating said user input is independent of actuation of said at least two amber light-emitting light emitting diodes by the driver actuating said turn signal actuator.

43. The lighted exterior rearview mirror system of claim 42, wherein said multifunction light module comprises a light-transmitting cover and wherein said plurality of light emitting diodes are disposed behind said light-transmitting cover and operable to emit light that passes through said light-transmitting cover, and wherein said light-transmitting cover comprises at least one of polycarbonate, polystyrene and acrylic.

44. The lighted exterior rearview mirror system of claim 43, wherein said white light-emitting light emitting diodes are generally linearly arranged on a circuit board.

45. The lighted exterior rearview mirror system of claim 43, wherein said ground illumination source is operable responsive to at least one of (i) a passive entry system of the equipped vehicle, (ii) approach of a driver to the equipped vehicle, (iii) opening a door of the equipped vehicle and (iv) actuation of a key fob.

46. The lighted exterior rearview mirror system of claim 45, wherein at least one of (a) when operated, said ground illumination source illuminates a portion of the side of the equipped vehicle and (b) said ground illumination source comprises a part of said multifunction light module.

47. The lighted exterior rearview mirror system of claim 42, wherein said multifunction light module comprises a light guide.

48. The lighted exterior rearview mirror system of claim 42, wherein said user input comprises one of a dial, a knob and a switch.

49. The lighted exterior rearview mirror system of claim 42, wherein said user input comprises at least one of a switch and a button.

* * * * *

UNITED STATES PATENT AND TRADEMARK OFFICE
CERTIFICATE OF CORRECTION

| | | |
|---|---|---|
| PATENT NO. | : 8,764,256 B2 | Page 1 of 1 |
| APPLICATION NO. | : 13/249433 | |
| DATED | : July 1, 2014 | |
| INVENTOR(S) | : Keith D. Foote et al. | |

It is certified that error appears in the above-identified patent and that said Letters Patent is hereby corrected as shown below:

In the Specification

Column 12
Line 61, "minor" should be --mirror--

Column 13
Line 35, "minor" should be --mirror--

In the Claims

Column 26
Line 29, Claim 27, "sad" should be --said--

Signed and Sealed this
Thirtieth Day of June, 2015

Michelle K. Lee
*Director of the United States Patent and Trademark Office*